US012535031B2

(12) United States Patent
Yang et al.

(10) Patent No.: US 12,535,031 B2
(45) Date of Patent: Jan. 27, 2026

(54) ENGINE

(71) Applicant: Zhejiang CFMOTO Power Co., Ltd., Zhejiang (CN)

(72) Inventors: Jing Yang, Hangzhou (CN); Yazhi Zhang, Hangzhou (CN); Zhaoju Chai, Hangzhou (CN); Guilin Xu, Hangzhou (CN); Xinhe Lv, Hangzhou (CN)

(73) Assignee: Zhejiang CFMOTO Power Co., Ltd., Hangzhou (CN)

(*) Notice: Subject to any disclaimer, the term of this patent is extended or adjusted under 35 U.S.C. 154(b) by 0 days.

(21) Appl. No.: 18/783,879

(22) Filed: Jul. 25, 2024

(65) Prior Publication Data

US 2024/0376842 A1 Nov. 14, 2024

Related U.S. Application Data

(63) Continuation of application No. PCT/CN2022/073888, filed on Jan. 25, 2022.

(51) Int. Cl.
*F02B 1/02* (2006.01)
*F02B 75/22* (2006.01)

(52) U.S. Cl.
CPC .............. *F02B 75/221* (2013.01); *F02B 1/02* (2013.01); *F02B 2275/18* (2013.01)

(58) Field of Classification Search
CPC .......... F02B 75/221; F02B 1/02; F02B 61/02; F02B 2275/18; F01M 1/04; F02D 9/08; F02F 1/24; F02F 1/42
See application file for complete search history.

(56) References Cited

U.S. PATENT DOCUMENTS 4,258,673 A * 3/1981 Stoody, Jr. ............. F01M 9/102 123/90.34
2005/0211212 A1* 9/2005 Novak .................. F01L 13/085 123/90.34

(Continued)

FOREIGN PATENT DOCUMENTS

CN 2553123 Y 5/2003
CN 1831394 A 9/2006

(Continued)

OTHER PUBLICATIONS

Machine translation, Detailed Description of JP2009270495A, Nakayama, obtained from https://worldwide.espacenet.com/, pp. 1-10.*

*Primary Examiner* — Grant Moubry
(74) *Attorney, Agent, or Firm* — Shewchuk IP Services, LLC; Jeffrey D. Shewchuk

(57) ABSTRACT

An internal combustion engine includes a throttle valve assembly having a main passage and an idle air passage. The main passage is in fluid communication with the intake valve, air being intermittently input into a combustion space through the main passage based on position of an intake valve. The idle air passage is integrally formed in the throttle valve body, and is controlled by a motor to selectively introduce air into the main passage downstream of the throttle plate. For a cylinder hole diameter in the range from 70 mm to 74 mm, both the intake valve angle defined between the intake valve axis and the cylinder axis and the exhaust valve angle defined between the exhaust valve axis and the cylinder axis are in the range from 11 degrees to 15 degrees.

20 Claims, 16 Drawing Sheets

(56) References Cited

U.S. PATENT DOCUMENTS

| | | | | |
|---|---|---|---|---|
| 2006/0016427 | A1 | 1/2006 | Uda et al. | |
| 2008/0178829 | A1 * | 7/2008 | Ochiai | F01L 1/022 123/193.5 |
| 2015/0167504 | A1 * | 6/2015 | Kinouchi | F01L 1/3442 123/90.15 |
| 2017/0101909 | A1 * | 4/2017 | Beyer | F01L 1/34 |
| 2018/0238205 | A1 * | 8/2018 | Koide | F01M 9/00 |
| 2019/0055865 | A1 * | 2/2019 | Nakamura | F01M 11/0004 |

FOREIGN PATENT DOCUMENTS

| | | | |
|---|---|---|---|
| CN | 101718233 | A1 | 6/2010 |
| CN | 202417729 | U | 9/2012 |
| CN | 203285503 | U | 11/2013 |
| CN | 203441607 | U | 2/2014 |
| CN | 109751133 | A | 5/2019 |
| CN | 109827061 | A | 5/2019 |
| CN | 214145689 | U | 9/2021 |
| DE | 102015104771 | A1 | 9/2016 |
| JP | 2005036758 | A | 2/2005 |
| JP | 2009162202 | A | 7/2009 |
| JP | 2009270495 | A | * 11/2009 |
| JP | 3159742 | U | 6/2010 |

* cited by examiner

ENGINE

RELATED APPLICATION INFORMATION

The present application is a continuation of PCT/CN2022/073888 filed on Jan. 25, 2022. The entire contents of the above-referenced application is incorporated herein by reference.

FIELD OF THE DISCLOSURE

This application relates to the field of power systems, and particularly to internal combustion engines.

BACKGROUND OF THE DISCLOSURE

In existing engines, when the engine is in idle state, the throttle valve assembly generally controls the intake of air to the engine through a hose. The idle state refers to a state in which the engine is running without load, that is, the clutch is in the engaged position, the transmission is in the neutral position, and the accelerator pedal is in the fully released position. However, the hose can cause air leakage problems in the throttle valve assembly due to the aging of the hose, weakened sealing, and other reasons.

In existing engines, arrangement of the intake and exhaust system of the engine affects the intake volume and stability of the engine. Arrangement of the intake and exhaust system also affects the exhaust temperature field distribution of the engine. A better balance between engine intake and exhaust needs to be realized, thereby improving the heat dissipation effect and service life of the engine. At the same time, it is also desired to make the engine structure compact while meeting the above requirements.

In existing technology, an oil pump is used to move lubricant splashed by the counterbalance mechanism and from the oil pan through the oil filter and then inject the lubricant through injection orifices to specific locations back inside the crankcase. However, as the engine heats up, pressure increases inside the crankcase increases. During the process of injecting lubricant back into the crankcase, the speed of lubricant injection back into the crankcase slows down due to the increase in crankcase pressure. Both the lubricant feed pressure to the oil pump and the lubricant back pressure leaving the oil pump increase. When the localized lubricant pressure in the oil pump reaches a certain amount, coolant and lubricant leakage problems can occur. In existing engines, the oil pump injects lubricant back into the inside of the crankcase solely through drilled orifice holes. Better localized lubricant pressure balance in the oil pump is needed to better avoid coolant and lubricant leakage problems.

SUMMARY OF THE INVENTION

The present application provides an engine with good sealing effect and compact structure to solve one of the problems above.

The engine includes a cylinder head, an intake and exhaust system, a cam assembly, a crankcase, a crankshaft and connecting rod assembly, a counterbalance mechanism, and a cylinder block. The cylinder head defines a head accommodation space. The intake and exhaust system is at least partially accommodated in the head accommodation space. The intake and exhaust system includes at least one intake valve reciprocating along an intake valve axis and at least one exhaust valve reciprocating along an exhaust valve axis. The cam assembly is at least partially accommodated in the head accommodation space for controlling timing of reciprocation of the intake and exhaust valves. The crankcase defines a crankcase accommodation space. The crankshaft and connecting rod assembly is at least partially accommodated in the crankcase accommodation space. The counterbalance mechanism is at least partially accommodated in the crankcase accommodation space. The counterbalance mechanism includes a first counterbalance shaft and a second counterbalance shaft both rotationally driven by rotation of the crankshaft. The cylinder block defines at least one cylinder hole, with a piston reciprocating in the cylinder hole along a cylinder axis. The cylinder block and the cylinder head are connected, with a combustion space in the cylinder hole between the piston and the cylinder head. The piston drives the crankshaft and connecting rod assembly to rotate about a crankshaft axis In one aspect, the engine further includes a throttle valve assembly having a main passage and an idle air passage. The main passage is in fluid communication with the intake valve, air being input into the combustion space through the main passage and based on position of the intake valve. The idle air passage is at least partially in fluid communication with the main passage. A transverse projection plane is defined containing the cylinder axis and perpendicular to the crankshaft axis. An intake valve angle defined between projections of the intake valve axis and the cylinder axis on the transverse projection plane is in the range from 11 degrees to 15 degrees. An exhaust valve angle defined between projections of the exhaust valve axis and the cylinder axis on the transverse projection plane is in the range from 11 degrees to 15 degrees. The diameter of the cylinder hole is in the range from 70 mm to 74 mm.

In another aspect, the idle air passage is integrally formed with the main passage and is at least partially in fluid communication with the main passage.

In another aspect, the engine includes an oil pump assembly with a rotating pump shaft, and a local pressure reduction groove having a lubricant channel and an air channel is defined around the pump shaft between the crankcase and the pump assembly. The local pressure reduction groove helps balance lubricant pressure in the oil pump assembly relative to the increased pressure inside the crankcase.

In another aspect, the cam assembly includes at least one camshaft and a shaft seat for supporting and containing the camshaft. Both the camshaft and its shaft seat are at least partially accommodated in the head accommodation space. The shaft seat has a lubricant hole penetrating through the shaft seat and in fluid communication with the camshaft.

In another aspect, a cylinder head cover is connected to the cylinder head and seals the head accommodation space. The cylinder head cover defines a spark plug hole and a ventilation hole in fluid communication with the spark plug hole. A sparking mechanism is received in the spark plug hole. The sparking mechanism includes a spark plug and an ignition coil. The ventilation hole is connected to the spark plug hole beneath at least a portion of the ignition coil.

Compared with existing engines, the present application has at least the following beneficial effects.

The throttle valve assembly is made by integrated molding, which avoids the risk of leakage caused by poor connection, aging, and other issues and improves the sealing of the throttle valve assembly. The angle of the intake and exhaust valves is reasonable, the structure of the engine can be made more compact, and the intake volume and exhaust temperature field distribution of the engine can be more reasonable. Pressure in the oil pump is better balanced, and the engine better avoids oil and coolant leaks. The camshaft can be kept better lubricated. Air pressure can equalize across the ignition coil by flow through the ventilation hole, keeping the ignition coil better secured on the spark plug.

DETAILED DESCRIPTION

For better understanding of the above objects, features and advantages of the present disclosure, the embodiments of the present disclosure will be described in detail below with reference to the accompanying drawings.

Figure 1:
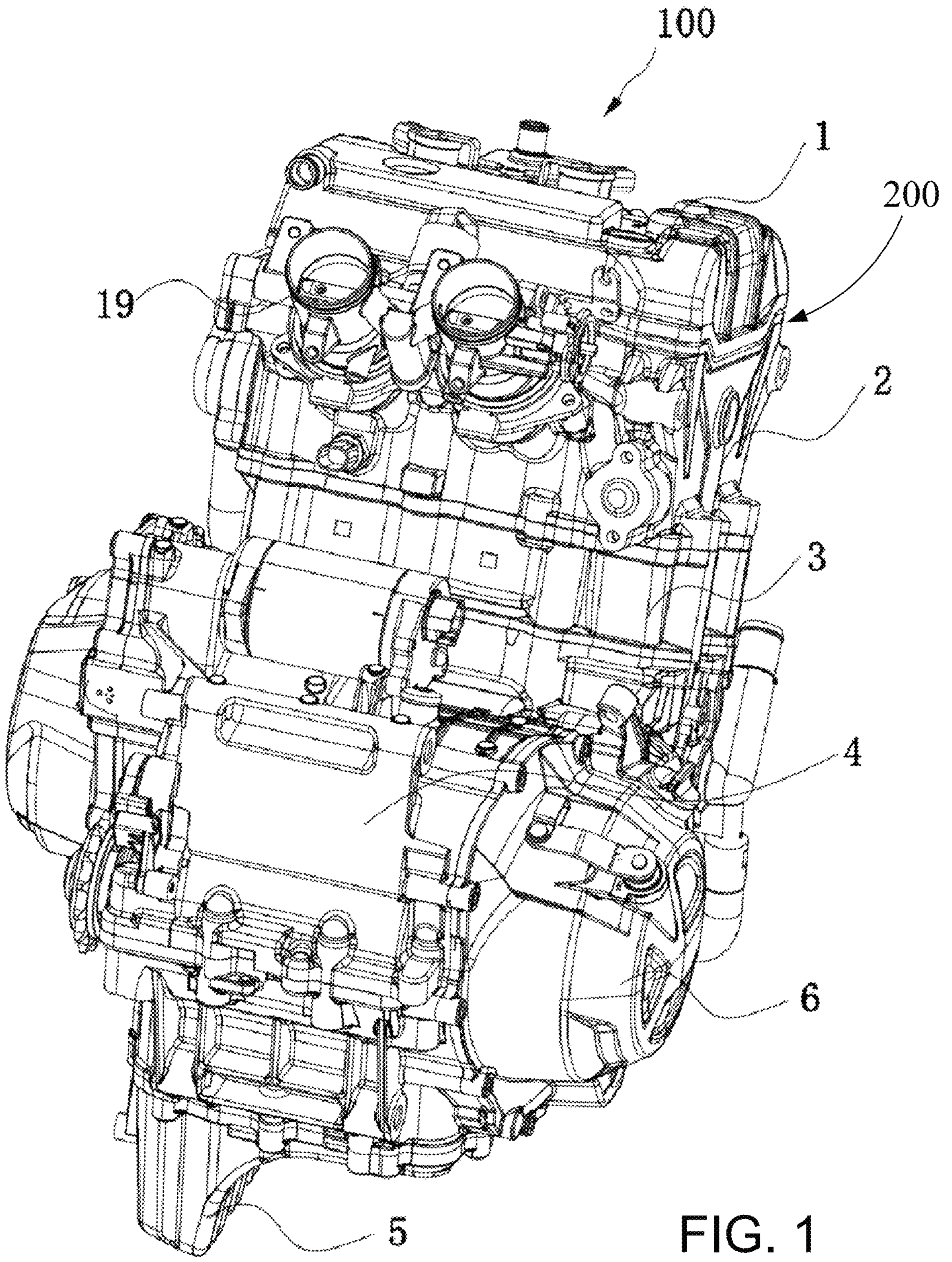
FIG. 1 is a perspective view from the air intake side of a preferred engine in accordance with the present invention.
Figure 2:
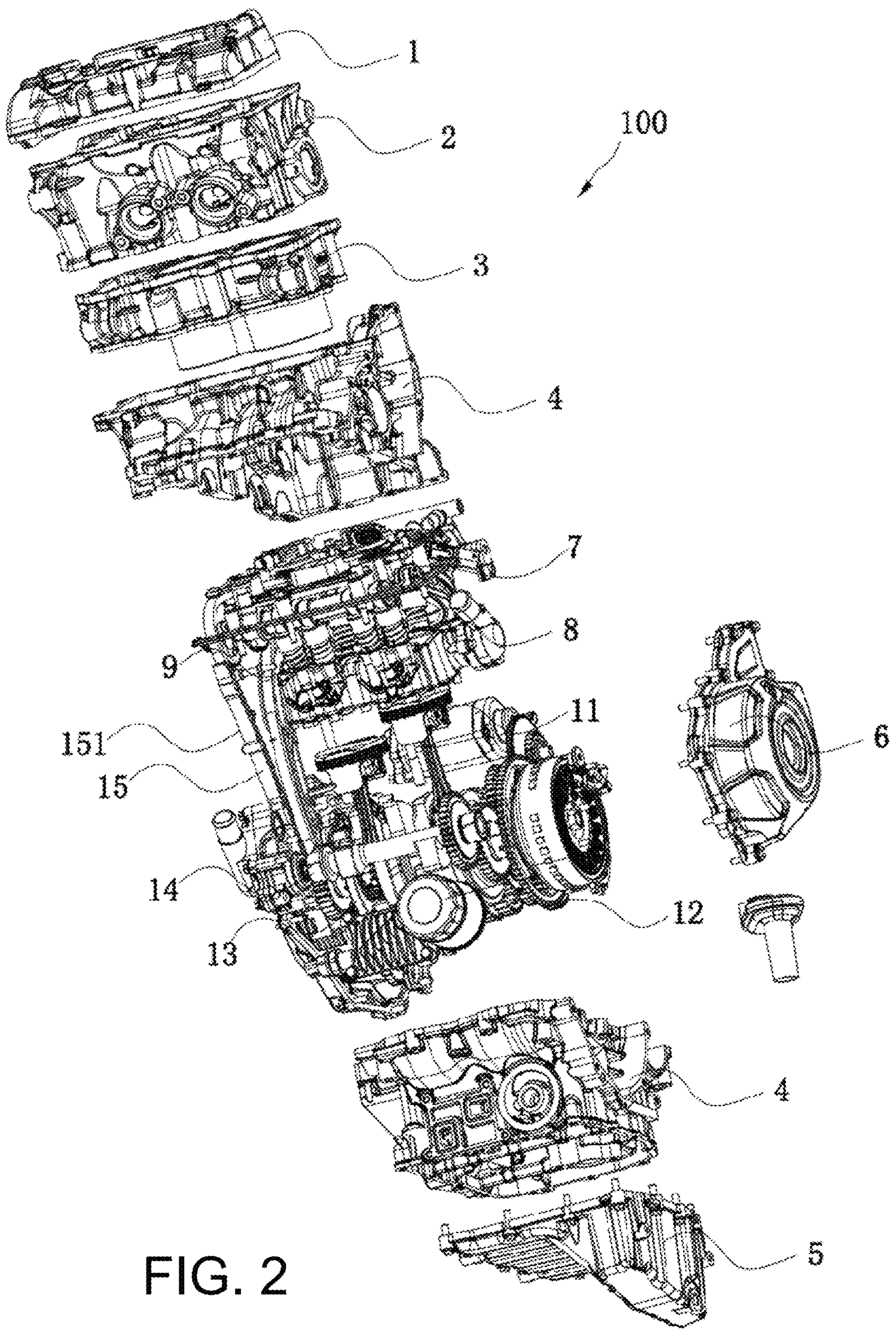
FIG. 2 is an exploded perspective view from the exhaust side of the engine of FIG. 1.
Figure 3:
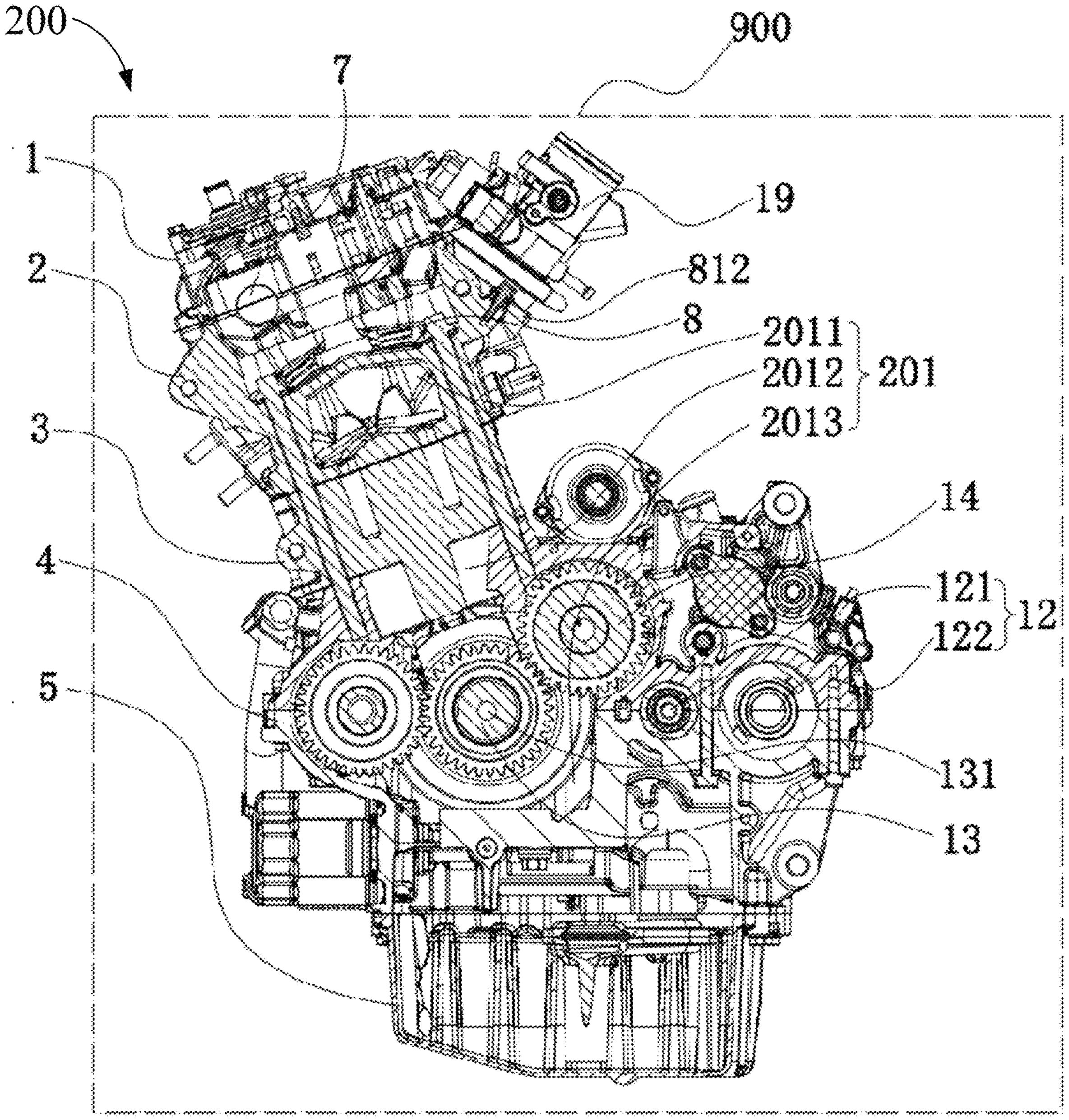
FIG. 3 is a cross-sectional end view of the engine of the FIGS. 1 and 2.

As shown in FIG. 1 to FIG. 3, an engine 100 includes a housing assembly 200, which includes a cylinder head cover 1, a cylinder head 2, a cylinder block 3, a two-piece crankcase 4, and an oil pan 5. Side covers 6 are arranged on at least one side and more preferably both sides of the crankcase 4. The cylinder head cover 1 is used for covering and sealing the cylinder head 2, which keeps lubricant inside the engine 100 and isolates dirt and moisture outside engine 100. A substantially sealed space for combustion, referred to herein as a combustion space 16 as called out in FIGS. 5 and 14, which must be able to withstand high temperature and high pressure, is defined between the cylinder head 2 and the cylinder block 3. The cylinder block 3 and the crankcase 4 are central structures of the engine 100. The oil pan 5 collects and stores lubricant that is freely splashed on friction surfaces inside the engine 100. After being connected to the crankcase 4, the oil pan 5 seals the crankcase 4 to prevent impurities from entering.

As shown in FIGS. 2-5, the engine 100 further includes a cam assembly 7, an intake and exhaust system 8, one or more sparking mechanisms 9, one or more piston mechanisms 11, a drive train 12, a crankshaft and connecting rod assembly 13, and a counterbalance mechanism 14. The housing assembly 200 defines an engine accommodation space 201, called out in FIG. 3. The cam assembly 7, the intake and exhaust system 8, the sparking mechanism(s) 9, the piston mechanism(s) 11, the drive train 12, the crankshaft and connecting rod assembly 13, and the counterbalance mechanism 14 are at least partially arranged in the engine accommodation space 201. The engine accommodation space 201 includes a head accommodation space 2011, a block accommodation space 2012, and a crankcase accommodation space 2013.

The cylinder head 2 defines the head accommodation space 2011, and the cam assembly 7, the intake and exhaust system 8, and the sparking mechanism(s) 9 are at least partially arranged in the head accommodation space 2011. The cylinder block 3 defines the block accommodation space 2012, and the piston mechanism(s) 11 is (are) at least partially arranged in the block accommodation space 2012. The crankcase 4 defines the crankcase accommodation space 2013, and the drive train 12, the crankshaft and connecting rod assembly 13, and the counterbalance mechanism 14 are at least partially arranged in the crankcase accommodation space 2013. The crankshaft and connecting rod assembly 13 is coupled to the cam assembly 7, the piston mechanism(s) 11, and the counterbalance mechanism 14. The cam assembly 7 contacts the intake and exhaust system 8.

Figure 4:
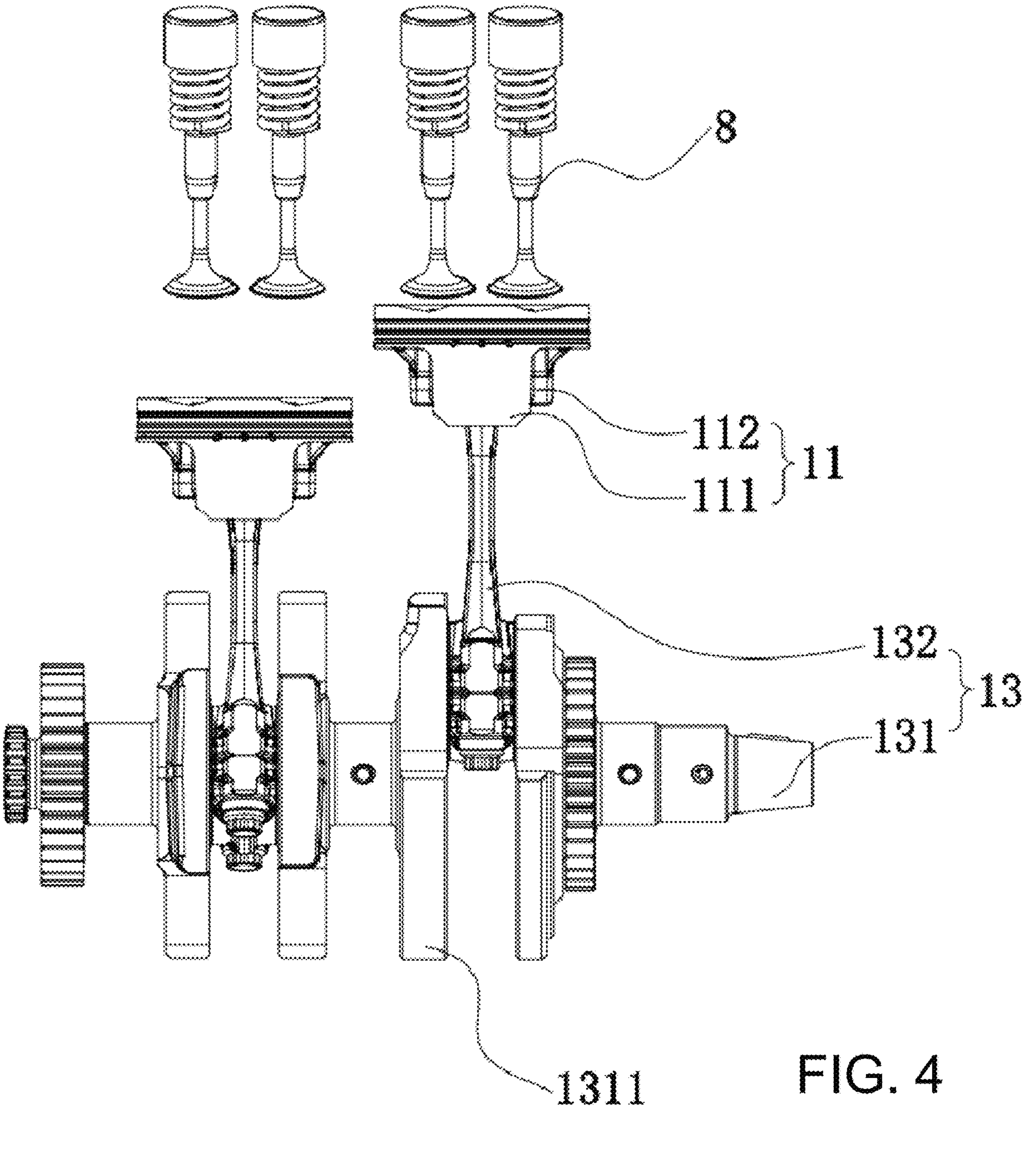
FIG. 4 is a figure showing partial structure of the engine of FIGS. 1-3.
Figure 5:
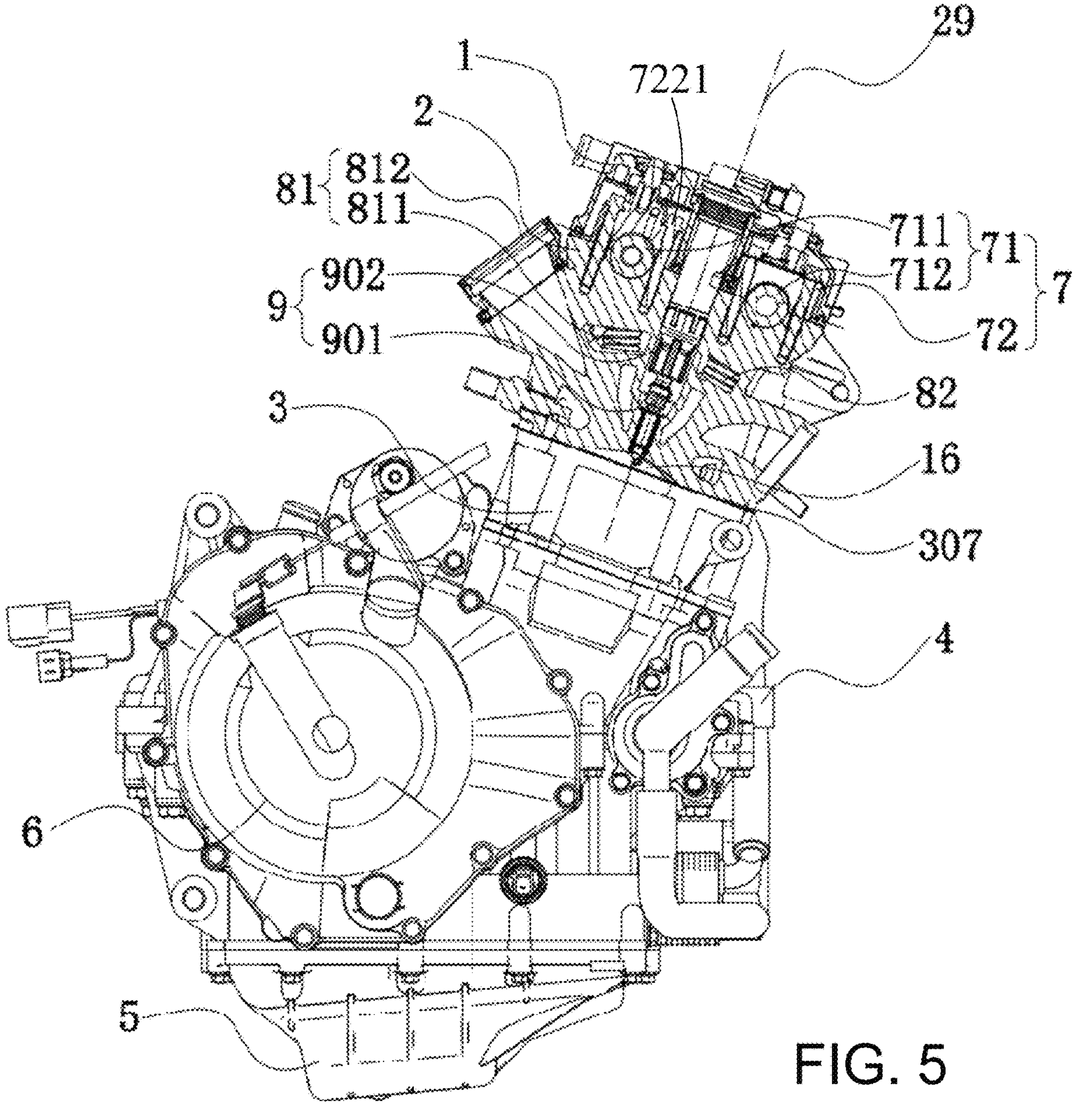
FIG. 5 is an end view, in partial cross-section, of the engine of FIGS. 1-3, but not showing the throttle valve assembly.
Figure 8:
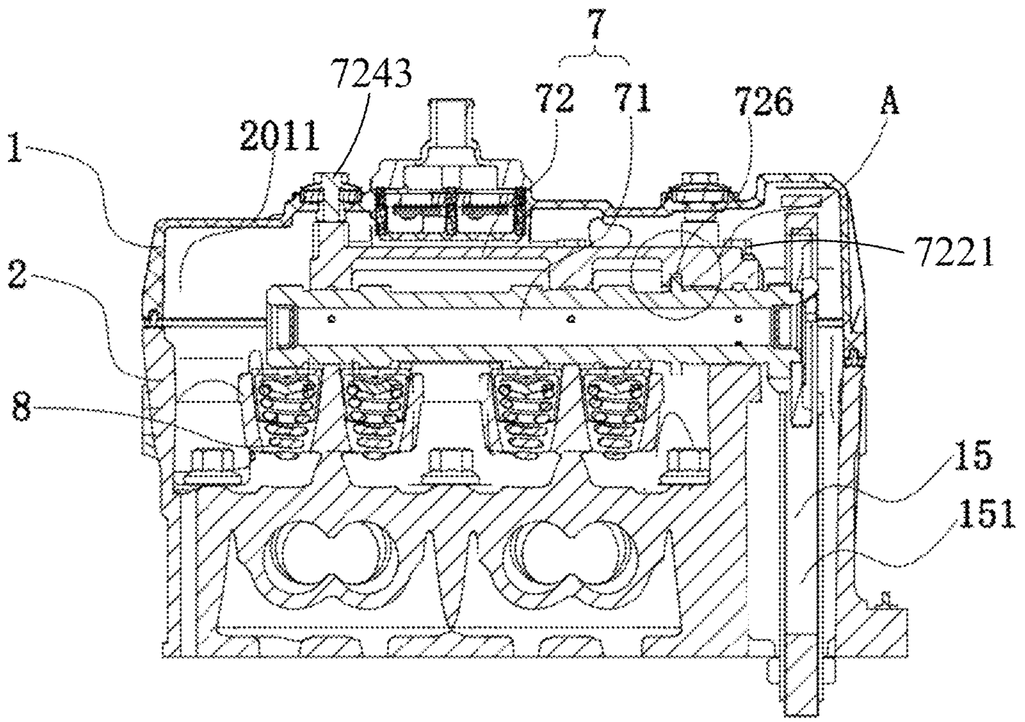
FIG. 8 is a cross-sectional view of a cylinder head, cylinder head cover, cam assembly and intake and exhaust system of the engine of FIGS. 1-3 and 5, taken at a shaft seat midline and axis of a camshaft.
Figure 23:
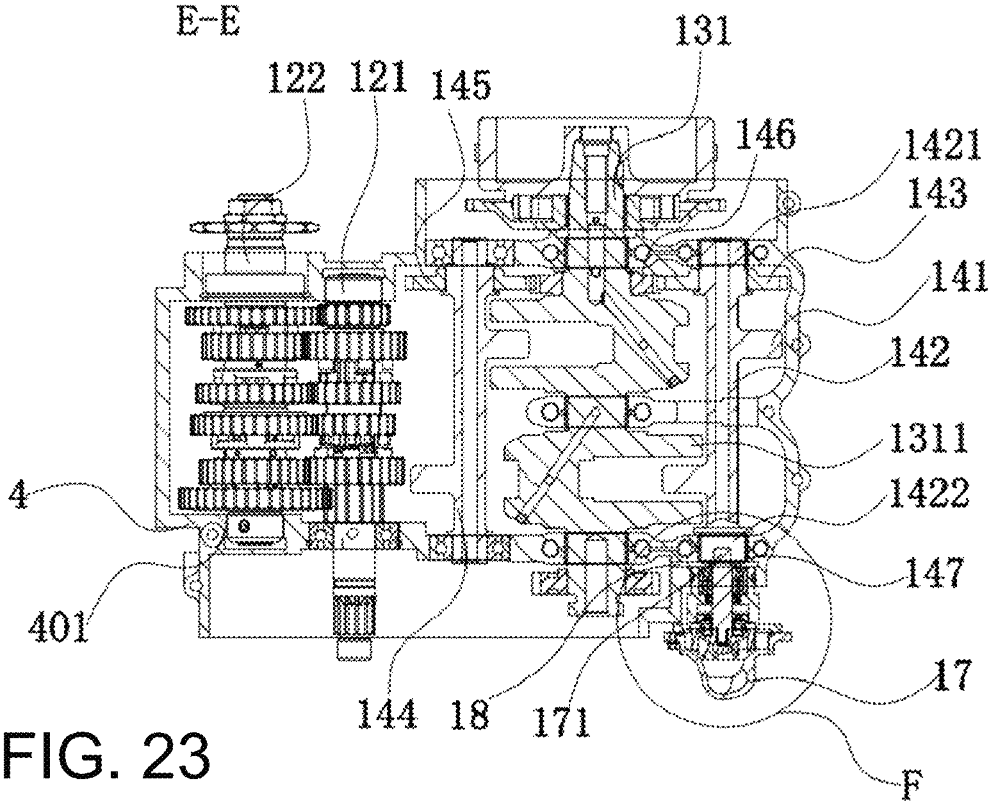
FIG. 23 is a cross-sectional view, taken at cut-line E-E in FIG. 22.

The intake and exhaust system 8 includes an intake side 81 and an exhaust side 82 called out in FIG. 5. The sparking mechanism(s) 9 is (are) positioned between the intake side 81 and the exhaust side 82, downstream of the intake side 81 and upstream of the exhaust side 82. The crankshaft and connecting rod assembly 13 includes a crankshaft 131 and one or more connecting rods 132 as shown in FIG. 4. Each connecting rod 132 is connected between its associated piston mechanism 11 and the crankshaft 131. The crankshaft 131 and the counterbalance mechanism 14 are preferably connected together by means of gear meshing. Each piston mechanism 11 includes a piston 111 and a piston pin 112. The piston 111 is connected to the connecting rod 132 by the piston pin 112. The sparking mechanism(s) 9 is (are) mounted on the cylinder head 2, generally between the cam assembly 7 and the cylinder block 3 as shown in FIG. 5. The cam assembly 7 includes camshaft(s) 71 and a shaft seat 72 for each camshaft 71. The preferred embodiment includes two camshafts 71 arranged as an intake camshaft 711 and an exhaust camshaft 712. Each shaft seat 72 holds its camshaft 71 to the cylinder head 2, and further connects the cylinder head cover 1 to the cylinder head 2. As shown in FIGS. 2 and 8, the crankshaft 131 is connected to the cam assembly 7 via a mechanical timing system 15 arranged in the engine accommodation space 201. The mechanical timing system 15 preferably includes a timing chain 151 connecting the crankshaft 131 to the cam assembly 7, but a timing belt or the like could alternatively be used. As shown in FIG. 3, the drive train 12 includes a drive main shaft 121 and a drive secondary shaft 122 connected together by means of gear meshing (shown in FIG. 23). The crankshaft 131 drives the drive train 12, and torque is transmitted to the front and/or rear wheels (not shown) of a vehicle through the drive train 12, thereby providing locomotion for the vehicle.

As called out in FIG. 5 (and FIG. 14), one or more combustion chambers 16 are defined as the space around each sparking mechanism 9 above the cylinder block 3. More specifically, the preferred embodiment has two combustion chambers 16 each defined as a space between the bottom surface of the cylinder head 2 and the top surface of the piston 111 when the piston 111 reaches top dead center. Top dead center is the piston position which is farthest from the center of rotation of the crankshaft 131. The top surface of the piston 111 refers to the end face of the piston 111 adjacent to the cylinder head 2, and the bottom surface of the cylinder head 2 refers to the surface of the cylinder head 2 adjacent to the top surface of the piston 111. Each piston 111 drives downwardly due to combustion and is driven upwardly by the crankshaft and connecting rod assembly 13, such that the piston 111 performs linear reciprocating motion in the cylinder block 3.

The intake side 81 is used for feeding a mixture of fresh air and combustible fuel into the combustion chamber(s) 16. Each sparking mechanism 9 ignites the combustible mixture to be burned in the associated combustion chamber 16. The associated piston mechanism 11 converts the expansion energy of combustion into mechanical energy and through the connecting rod 132 drives the crankshaft 131 to rotate. The crankshaft 131 drives the cam assembly 7 to move through the mechanical timing system 15, thereby timing and causing the opening and closing of the intake side 81 and the exhaust side 82. Meanwhile, the crankshaft 131 drives the drive train 12 to transmit torque to the vehicle. The exhaust side 82 exports the burned exhaust gas, thereby allowing the burned exhaust gas to be discharged typically through a muffler and/or catalytic converter (neither shown) into the atmosphere.

As called out in FIGS. 1 and 3, the engine 100 includes a throttle valve assembly 19 connected to the housing assembly 200 such as by being bolted to the cylinder head 2. The throttle valve assembly 19 is a controllable valve that controls airflow entering the intake side 81 of the engine 100. Fuel is mixed (either in a carburetor (not shown) or one or more direct or indirect fuel injectors (not shown)) with the incoming airflow to become the combustible mixture.

Figure 6:
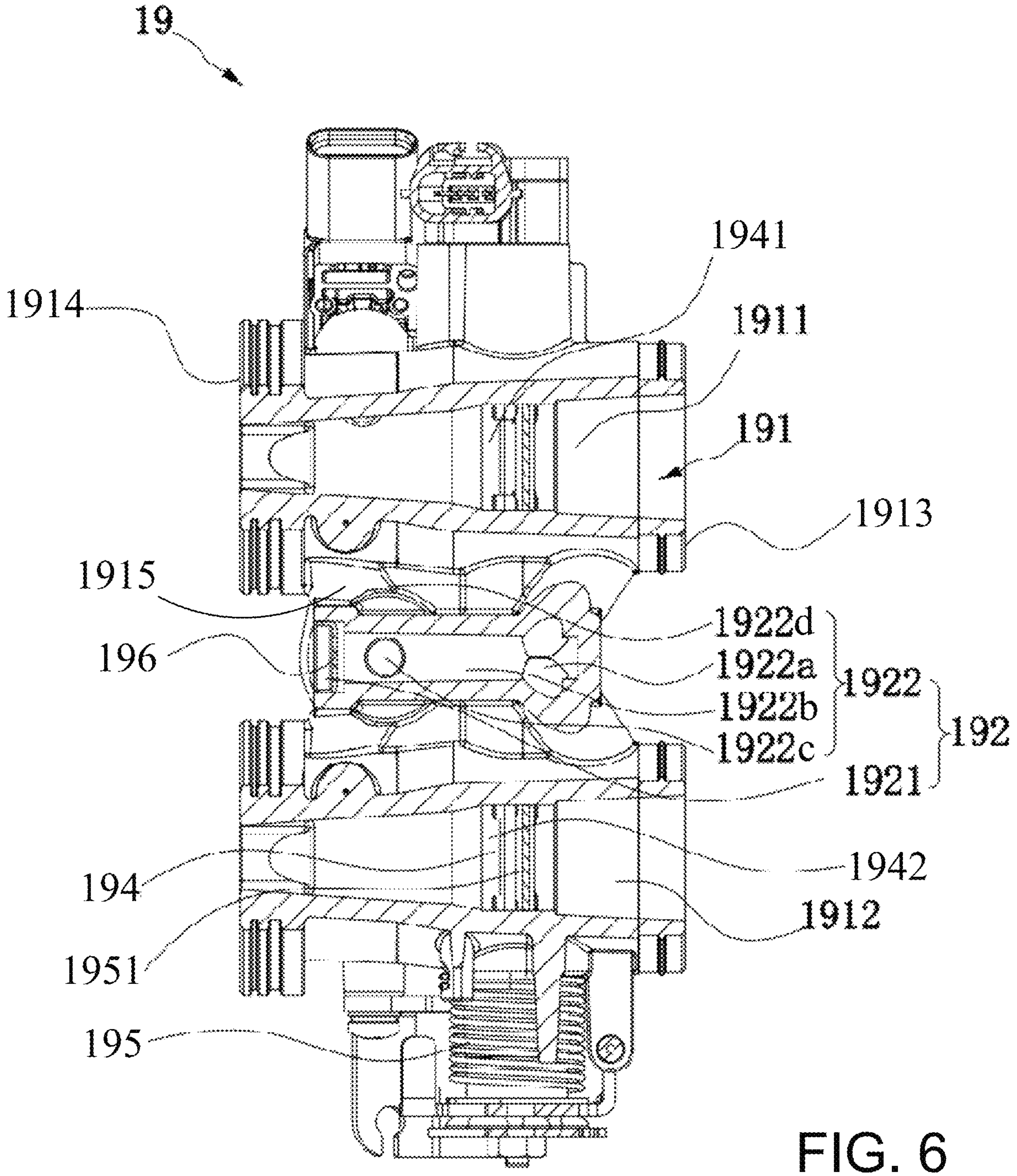
FIG. 6 is a cross-sectional view of the throttle valve assembly of the engine of FIGS. 1-3, taken through the axis of the idle valve.
Figure 7:
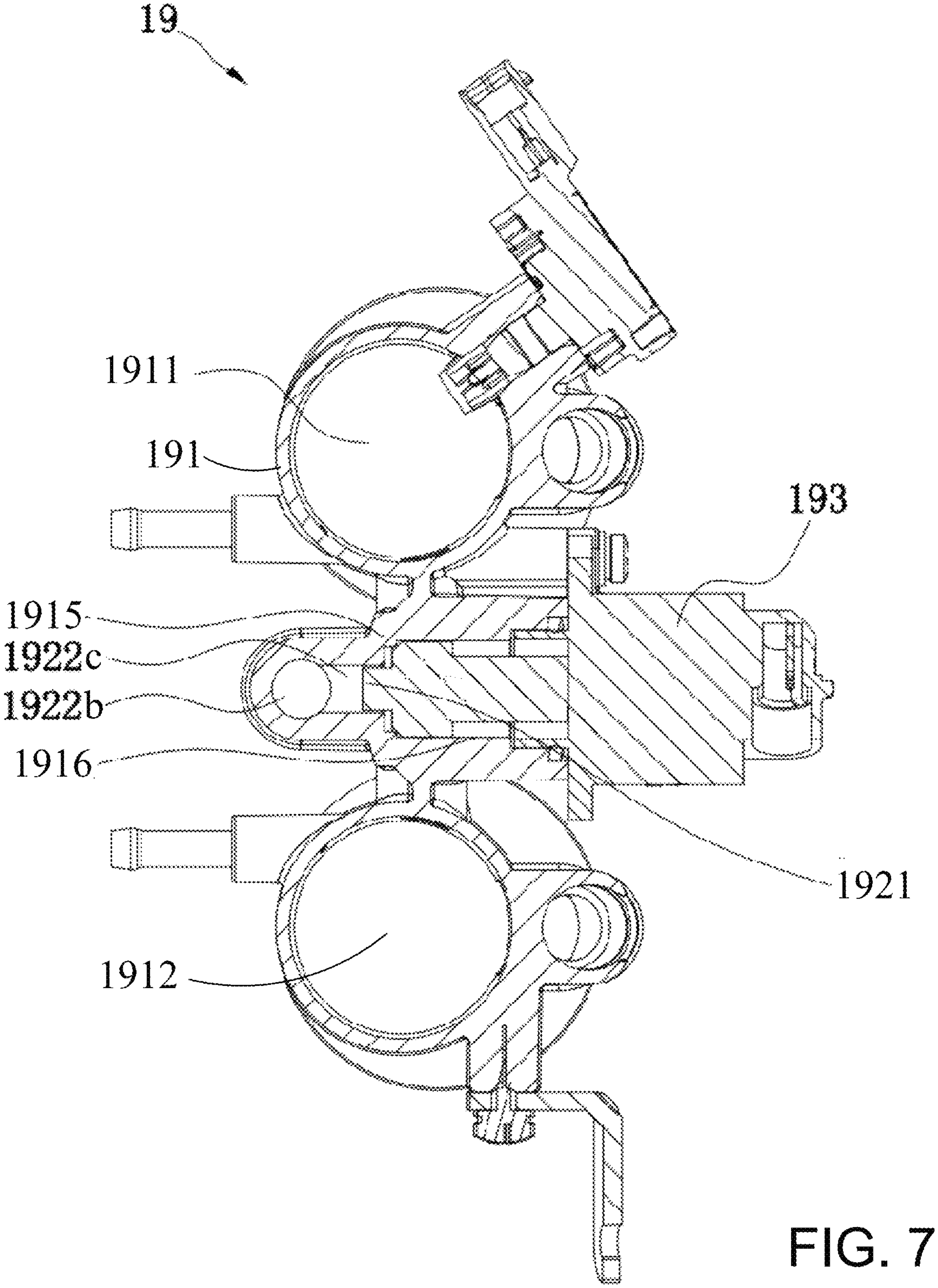
FIG. 7 is a cross-sectional view of the throttle valve assembly of FIG. 6, taken transverse to the axis of the idle valve.

FIGS. 6 and 7 better show the throttle valve assembly 19 for use with a two cylinder engine. The throttle valve assembly 19 includes a main body 191 defining a main passage 1911, 1912 for each cylinder, an idle valve 192, an idle valve motor 193, and flow control elements 194 such as a throttle plate 1941, 1942 for each main passage 1911, 1912. An upstream end 1913 of each main passage 1911, 1912 of the throttle valve assembly 19 is in constant fluid communication to receive incoming fresh air filtered through an air filter (not shown). A downstream end 1914 of each main passage 1911, 1912 of the throttle valve assembly 19 is connected in fluid communication with the intake side 81 of the cylinder head 2, and thereafter in intermittent fluid communication with the combustion chamber 16 through an intake valve mechanism 811 and an intake duct 812 shown in FIG. 14.

The engine 100 has at least an idle state and a torque-delivery state. When the engine 100 is in the idle state, the main passages 1911, 1912 are closed each by their throttle plate 1941, 1942, and the intake of the engine 100 is controlled by the idle valve 192. The idle state refers to the state in which the engine 100 is running without load, that is, the clutch (not shown) is in the engaged position, the transmission (not shown) is in the neutral position, and the accelerator pedal (not shown) is in the fully released position. When the engine 100 is in the idle state, the idle valve motor 193 controls the idle valve 192 to open. When the engine 100 is in the torque-delivery state, the throttle plates 1941, 1942 are rotated to at least partially open the main passages 1911, 1912, the idle valve motor 193 controls the idle valve 192 to close, and the intake of the engine 100 is controlled by airflow through the main passages 1911, 1912 under control of the throttle plates 1941, 1942.

More specifically, the idle valve 192 has an idle air passage 1922 that includes one or more idle air inlets **1922*a* connected to an idle airway 1922*b*, with one or more idle air vents 1922*c* off the idle airway 1922*b* which can communicate with an idle air outlet 1922*d* for each main passage 1911, 1912. The idle valve motor 193 may be a stepper motor or the like. Air is input from the idle air inlet(s) 1922*a*, thereby allowing the air to pass through the idle airway 1922*b*. When the engine 100 is in the idle state, the idle valve motor 193 positions a sealing element 1921 so the idle air vent(s) 1922*c* communicate with the idle air outlets 1922*d*. Air flows from the idle airway 1922*b* through the idle air vents 1922*c* and the idle air outlets 1922*d* into the main passages 1911, 1912 downstream of the throttle plates 1941, 1942 and the into the intake ducts 812 in sequence. When the engine 100 transitions into the torque-delivery state, the idle valve motor 193 moves the sealing element 1921 so the idle air vent(s) 1922*c* are closed off to fluid communication with the idle air outlets 1922*d*. Air does not flow through the idle valve 192, and airflow through the main passages 191 is exclusively controlled by positioning of the throttle plates 1941, 1942**.

Each throttle plate 1941, 1942 is connected to a throttle cable connection 195 through a shaft linkage 1951. The throttle plates 1941, 1942 may be circular steel sheets each with a diameter to match the inner diameters of the main passages 1911, 1912. Movement of the throttle cable connection 195 causes the shaft linkage 1951 to cause the throttle plates 1941, 1942 to pivot up to 90°, between a fully closed position where the axis of each throttle plate 1941, 1942 (the axis defined by its shape, not its pivot axis) is substantially parallel to and coincides with the axis of the associated main passage 1911, 1912, and a fully opened position where the axis of each throttle plate 1941, 1942 is substantially perpendicular to the axis of the associated main passage 1911, 1912. The amount of air flowing during the torque-delivery state is entirely controlled by the size of the gap between the throttle plate 1941, 1942 and its associated main passage 1911, 1912.

In the preferred embodiment, an axis defined by the first main passage 1911 is substantially parallel to an axis defined by the second main passage 1912. The idle valve 192 is between the first main passage 1911 and the second main passage 1912, positioned in a connection portion 1915 of the throttle valve body 191 arranged between the first main passage 1911 and the second main passage 1912. An axis defined by the idle airway 1922*b* is substantially parallel to the axis of the first main passage 1911 and to the axis of the second main passage 1912. The idle airway 1922*c* is substantially centered midway between the main passages 1911, 1912, thereby making it easy for air to be uniformly input into the two idle air outlets 1922*d*. The idle valve motor 193 is positioned in a motor groove 1916 adjacent to the output end 1914 of the throttle valve body 191. The idle air inlet(s) 1922*a*, idle airway 1922*b*, idle air vent(s) 1922*c*, and idle air outlets 1922*d* of the idle valve 192 are integrally formed with the throttle valve body 191, thereby avoiding any risk of leakage caused by poor connection, aging, and other issues, and improving the sealing performance of the throttle valve assembly 19. A plug 196 is used to fill a machining opening formed on the throttle valve body 191, so as to improve the sealing performance of the throttle valve assembly 19 during use. The shape of the plug 196 is bowl shaped. Some alternative embodiments are single cylinder engines, with the throttle valve assembly 19 appropriately simplified.

Figure 9:
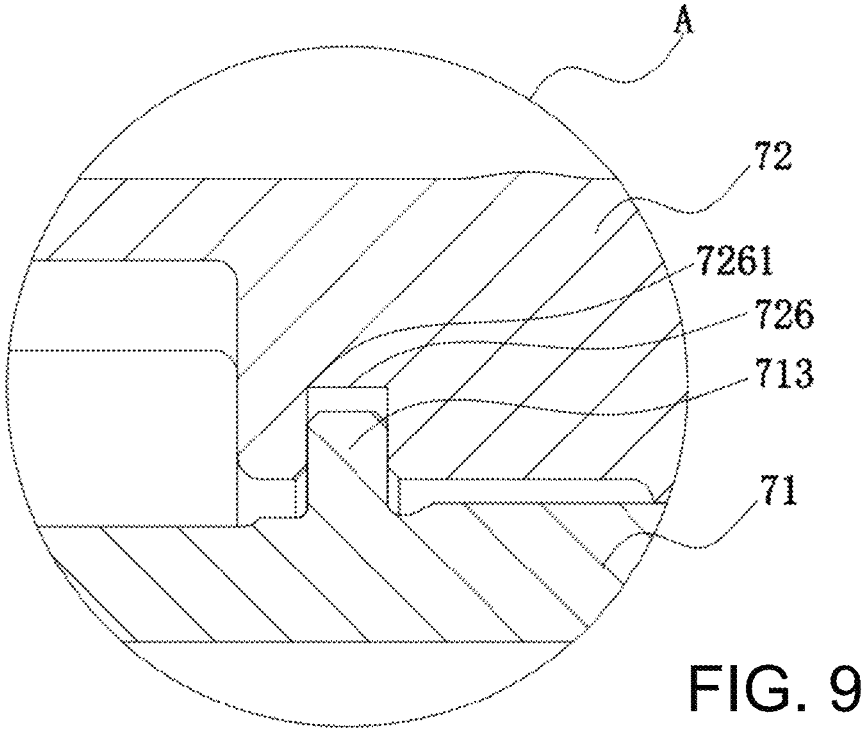
FIG. 9 is enlarged view of part A in FIG. 8.

As shown in FIG. 8 and FIG. 9, the cam assembly 7 includes camshaft(s) 71 and shaft seat(s) 72. The preferred embodiment is a dual overhead cam arrangement using the intake camshaft 711 and the exhaust camshaft 721 shown in FIG. 5. The shaft seat(s) 72 is (are) at least partially connected to the cylinder head 2. Each shaft seat 72 is used to support/contain and lubricate its associated camshaft 71. The sparking mechanism(s) 9 is (are) generally arranged in one radial direction off the camshaft(s) 71, and each shaft seat 72 is generally arranged in the opposing radial direction off its associated camshaft 71, i.e., the sparking mechanism(s) 9 is (are) generally below the camshaft(s) 71 while each shaft seat 72 is generally above its associated camshaft 71.

Figure 10:
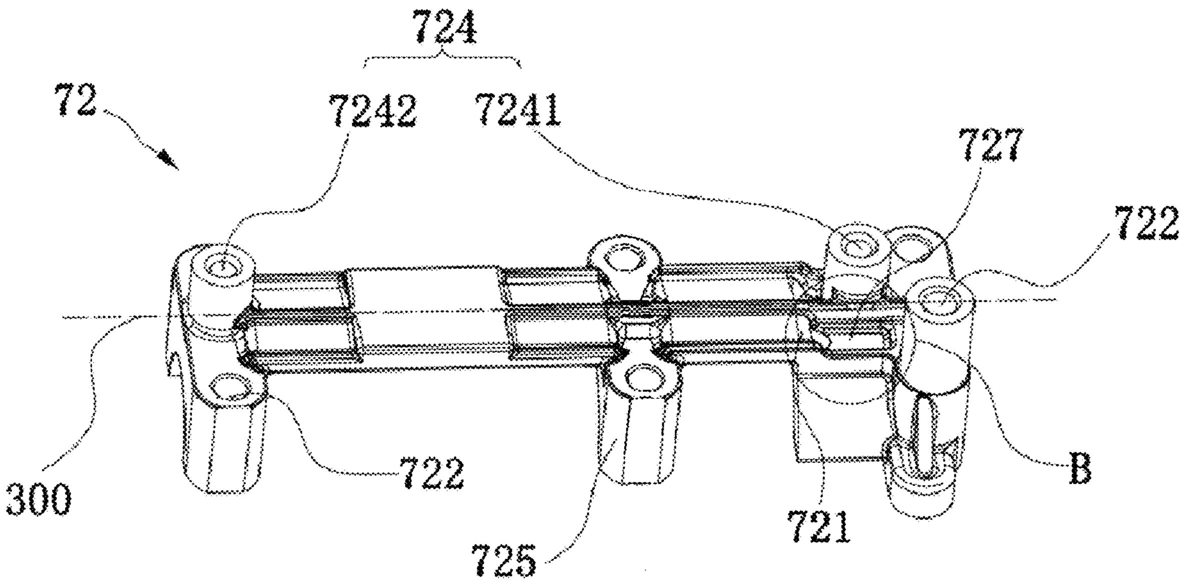
FIG. 10 is a perspective view of a shaft seat of FIG. 8.

As shown in FIGS. 8 and 10, the surface of the shaft seat 72 away from the camshaft(s) 71 is considered the upper surface, and the upper surface of the shaft seat 72 extends substantially along a straight shaft seat midline 300. Each cylinder hole 301 in the cylinder block 3 defines a cylinder axis 29 (called out in FIGS. 5, 14, 16, 19 and 21) running through the cylinder head 2, and the shaft seat midline 300 is in a plane perpendicular to the cylinder axis 29.

Several (in the preferred embodiment, six) shaft seat mounting holes 722 and several (in the preferred embodiment, two) cover mounting holes 724 are defined on the shaft seat 72. The shaft seat mounting holes 722 are through-holes used to fix the shaft seat 72 on the cylinder head 2 using bolts 7221 shown in FIGS. 5 and 8, and the cover mounting holes 724 are used to mount the cylinder head cover 1 on the shaft seat 72 using bolts 7243 shown in FIG. 8. One or more of the shaft seat mounting holes 722 may also serve for mounting the mechanical timing system 15. As best shown in FIG. 10, the shaft seat mounting holes 722 are preferably evenly distributed along the periphery of the shaft seat 72, and the cover mounting holes 724 are internally threaded and preferably positioned on the shaft seat midline 300. Bosses 725 can be provided for each of the shaft seat mounting holes 722 and for each of the cover mounting holes 724. The cover mounting holes 724 include a first cover mounting hole 7241 and a second mounting hole 7242. The first cover mounting hole 7241 is spaced inwardly from the end of the shaft seat 72, and the second mounting hole 7242 is positioned at the other end of the shaft seat 72.

In preferred embodiments, the shaft seat 72 includes a camshaft limit mechanism 726 (as shown in FIG. 8 and FIG. 9), a sump structure 727, and a lubricant hole 728. The camshaft limit mechanism 726 is positioned adjacent to the first cover mounting hole 7241, and is matched with the associated camshaft 71 to limit the camshaft 71 against longitudinal movement. The sump structure 727 and the lubricant hole 728 improve lubrication of the associated camshaft 71. In existing engines, splash lubrication (such as splashed out by the counterbalance mechanism) is used for lubrication of the camshaft(s). However, existing shaft seat(s) may sometimes act as a shield and cause insufficient lubricant to reach the camshaft(s). Insufficient lubrication may be especially acute at the camshaft limit mechanism, which can cause an increase in axial displacement caused by wear between the camshaft and its camshaft limit mechanism. To avoid poor lubrication, the sump structure 727 is used to collect and store splashed lubricant, which increases the amount of lubricant reaching the surface of the associated camshaft 71, and provides good lubrication effect for the camshaft 71. The lubricant hole 728 runs through the shaft seat 72, and is in fluid communication with the surface of the camshaft 71. The sump structure 727 channels lubricant down to a low point which is both adjacent to the lubricant hole 728 and adjacent to the first cover mounting hole 7241, which is convenient for fitting with the camshaft 71. The sump structure 727 is arranged around the lubricant hole 728, thereby effectively allowing the splashed lubricant to be collected in the sump structure 727 and deposited onto the camshaft 71 through the lubricant hole 728, improving lubrication on the camshaft 71 and especially improving the lubrication effect on the camshaft limit mechanism 726.

Figure 11:
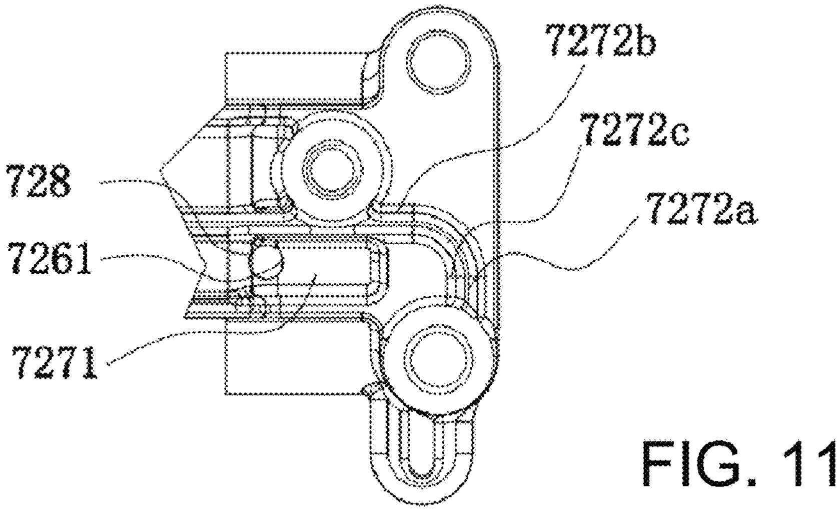
FIG. 11 is a plan view of an end of the shaft seat of FIGS. 8 and 10.
Figure 12:
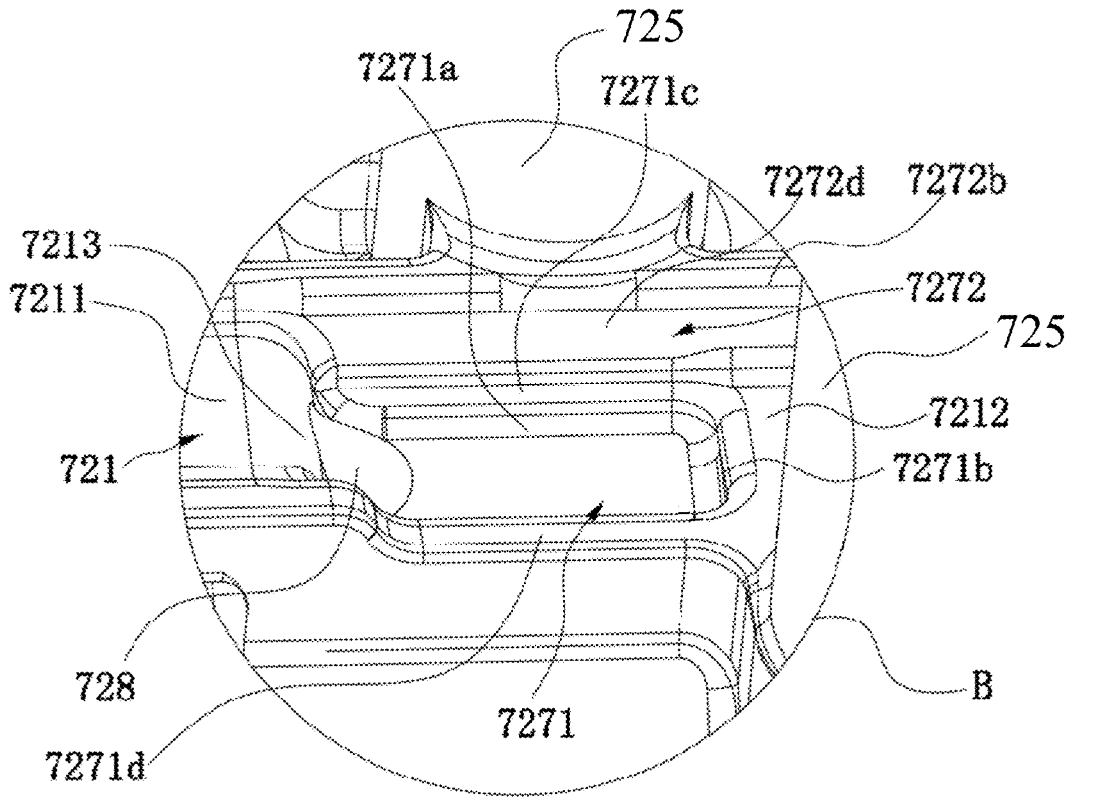
FIG. 12 is enlarged view of part B in FIG. 10.

As shown in FIG. 10 to FIG. 12, the sump structure 727 preferably includes a sump well 7271 and one or more sump baffles 7272. The sump well 7271 and the first cover mounting hole 7241 are positioned at the same end of the shaft seat 72 as each other but on opposing sides of the shaft seat midline 300. The sump well 7271 preferably runs for a short distance substantially parallel to the camshaft 71. The sump baffle(s) 7272 help(s) lubricant from sloshing out of the sump well 7271, particularly as the vehicle accelerates, decelerates and curves around corners to change the direction of g-forces on the lubricant.

The preferred sump baffles 7272 include a first baffle 7272*a* and a second baffle 7272*b* that are connected to each other via a circular arc. One end of the first baffle 7272*a* extends to the boss 725 for one of the bolt holes 722, the other end of the first baffle 7272*a* is connected to one end of the second baffle 7272*b*, and the other end of the second baffle 7272*b* extends over the boss 725 of the first cover mounting hole 7241. An inner surface 7272*d* of the second baffle 7272*b* and an inner surface 7271*a* of the sump well 7271 adjacent to the second baffle 7272*b* extend substantially in the same plane and can better collect and store splashed lubricant, thereby increasing the amount of lubricant and effectively improving lubrication efficiency. The surface of the shaft seat 72 is equipped with at least one trough 721 running longitudinally alongside the shaft seat midline 300. The trough 721 has a higher surface 7211 and a lower surface 7212 separated by a step connection 7213. The second baffle 7272*b* extends on the boss 725 for the first cover mounting hole 7241 to the step connection 7213. The sump well 7271 and the sump baffles 7272 are both located on the lower surface 7212.

The sides of the sump well 7271 use the baffles 7272 to trap lubricant splashed onto the surface of the shaft seat 72. Due to the fact that shaft seat 72 is generally inclined or canted once the engine 100 is mounted as shown in FIG. 3, the bottom surface of the sump well 7271 is usually inclined/ canted relative to vertical. The sump well 7271 includes a midline longitudinal edge 7271*c* and a side longitudinal edge 7271*d*. If desired, along the extension direction of the cylinder axis 29, the midline longitudinal edge 7271*c* may be located at the same height as the side longitudinal edge 7271*d*. Alternatively, along the extension direction of the cylinder axis 29, the midline longitudinal edge 7271*c* and the side longitudinal edge 7271*d* may be located at the different heights, thereby compensating for the incline/cant. For example, the midline longitudinal edge 7271*c* is higher than the side longitudinal edge 7271*d* as measured along the cylinder axis 29, so when mounted both the midline and side longitudinal edges 7271*c*, 7271*d* are at equal vertical elevations relative to a ground plane. Therefore, after mounting the engine 100, as much lubricant as possible is retained in the sump well 7271, thereby increasing the amount of lubricant applied to the camshaft 71.

Each sump baffle 7272 has a semi enclosed shape, which can avoid the problem of less lubricant collection caused by the lubricant being blocked by the sump baffles 7272, reduce material waste and reduce processing difficulty, and effectively collect lubricant that overflows from the sump well 7271, thereby increasing the storage capacity of lubricant and providing good lubrication effect for the camshaft 71.

The first baffle 7272*a* and the second baffle 7272*b* may be located at the same height as measured along the cylinder axis 29 or may alternatively be located at different heights as measured along the cylinder axis 29. The sump baffles 7272 are arranged on the upper surface of the shaft seat 72, and the first baffle 7272*a* and the second baffle 7272*b* are connected to the sump well 7271 and surround at least a portion of the sump well 7271. A first baffle inner surface 7272*c* extends higher from the lubricant hole 728 than a sump end surface 7271*b*, which can collect and retain more lubricant.

The camshaft limit mechanism 726 includes a shaft groove 7261, and the camshaft 71 is equipped with an annular peripheral protrusion 713. The shaft groove 7261 is on the lower surface of the shaft seat 72 and mates around the annular peripheral protrusion 713 on the camshaft 71, thereby limiting the camshaft 71 against longitudinal movement. The bottom of the lubricant hole 728 is in fluid communication with the shaft groove 7261, which facilitates the collected lubricant to flow into the shaft groove 7261 through the lubricant hole 728. This improves the lubrication effect, reduces wear between the annular peripheral protrusion 713 and the shaft groove 7261, and prevents excessive axial displacement. The bottom of the sump well 7271 connects into the lubricant hole 728, allowing lubricant to gravitationally flow smoothly into the lubricant hole 728 and providing good lubrication effect for the camshaft 71.

The lubricant hole 728, the sump well 7271, and the sump baffles 7272 may be arranged on either side of shaft seat midline 300 to facilitate the entry of lubricant into the shaft groove 7261. Depending upon engine design and layout of the mechanical timing system 15, the rotation direction of the camshaft 71 may be either clockwise or counterclockwise. The shaft seat position and orientation are designed according to the rotation direction of the camshaft 71, thereby improving the lubrication effect.

Figure 13:
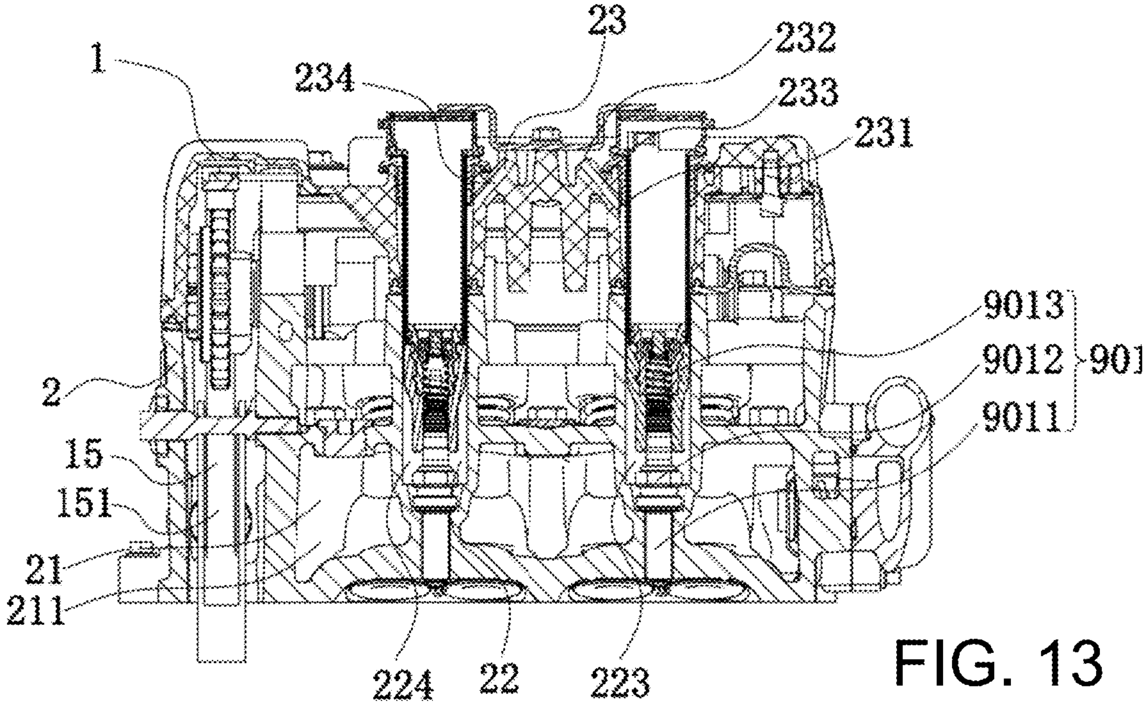
FIG. 13 is a cross-sectional view of the cylinder head, cylinder head cover, cam assembly and intake and exhaust system of FIG. 8, taken at the cover midplane.
Figure 14:
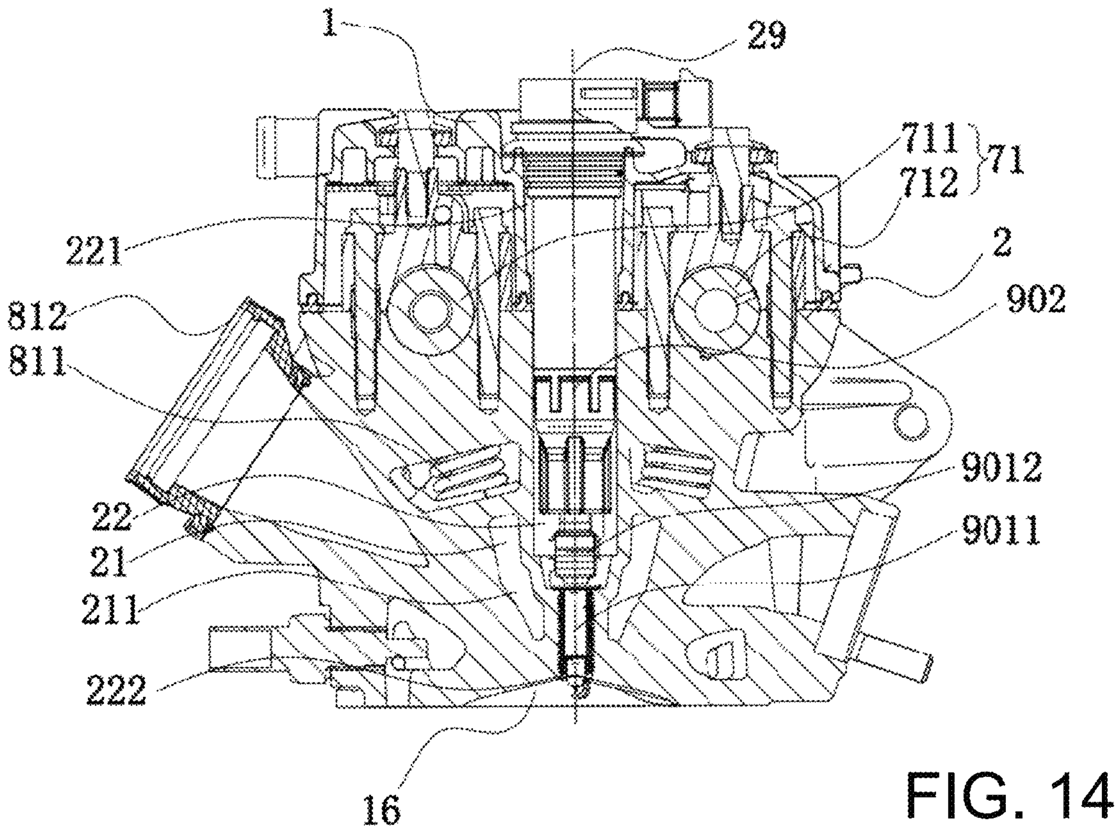
FIG. 14 is a cross-sectional view of the cylinder head, cylinder head cover, cam assembly and intake and exhaust system of FIGS. 8 and 13, taken transverse to the shaft seat midline and at a cylinder axis.
Figure 20:
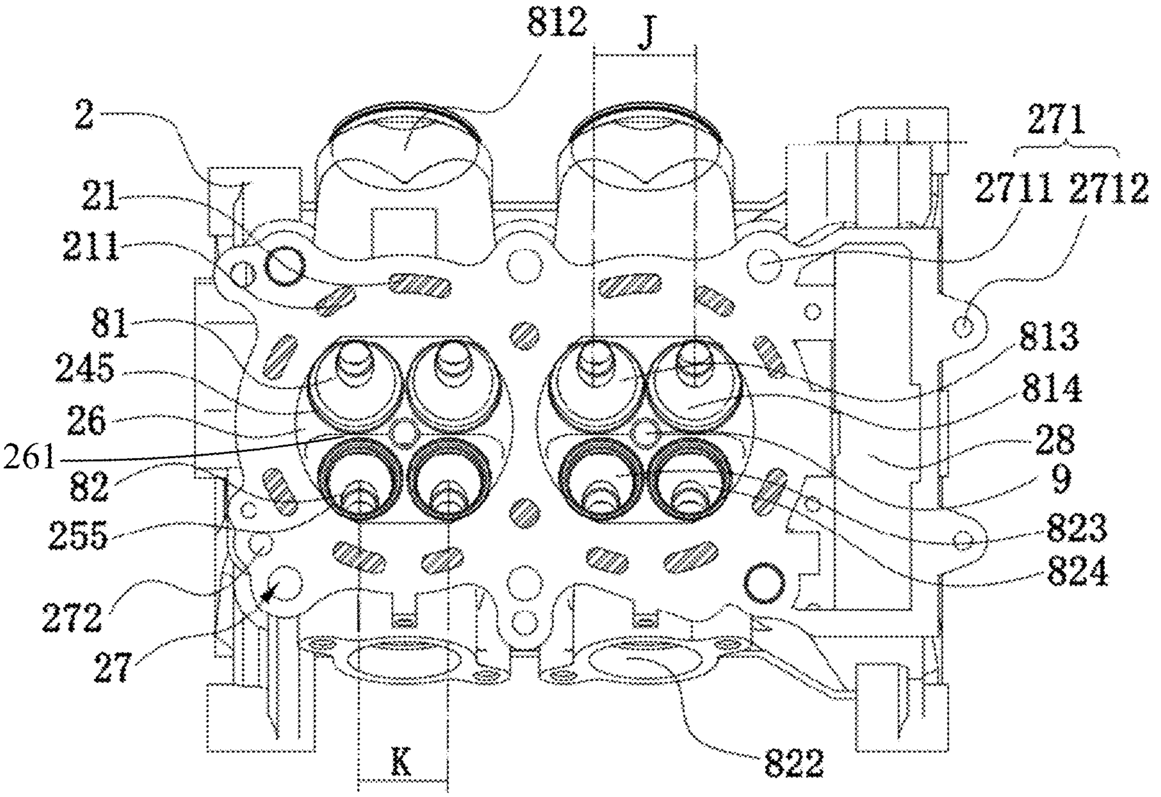
FIG. 20 is a bottom plan view of the cylinder head of FIGS. 1-3, 5, 8, 13 and 14.

As shown in FIGS. 13, 14 and 20, the cylinder head 2 is equipped with a cooling network 21, which includes at least one cooling channel 211 for cooling the sparking mechanism 9 and for cooling the cylinder head 2. A shown in FIG. 20, the cooling channels 211 are distributed around a cylinder port 26 for each cylinder of the engine 100. As shown in FIGS. 13 and 14, the cooling channels 211 extend within the cylinder head 2 to one or more positions around the sparking mechanism 9 to facilitate cooling and improve the heat dissipation effect of the sparking mechanism 9.

A spark plug hole 22 is defined on the cylinder axis 29 of each cylinder hole 301. A top end of each spark plug hole 22 is accessible through the cylinder head cover 1, and a bottom end of each spark plug hole 22 is in fluid communication with the combustion chamber 16. Each spark plug hole 22 includes a cover through-hole 221 defined on its top end through the cylinder head cover 1 and a head through-hole 222 defined on its bottom end through the cylinder head 2. The preferred engine 100 is a twin cylinder engine including a first spark plug hole 223 and a second spark plug hole 224. A centerline of each spark plug hole 22 substantially coincides with the respective cylinder axis 29. The sparking mechanism 9 is arranged in each spark plug hole 22, so that the sparking mechanisms 9 are positioned at the centerline of the cylinder head 2. Each sparking mechanism 9 includes a spark plug 901 and an ignition coil 902. A top end of the spark plug 901 is positioned in the ignition coil 902, and the bottom end of the spark plug 901 extends through the head through-hole 222.

During operation of prior art engines, air in the spark plug hole can heat up and expand, which can increase pressure on a bottom side of the ignition coil and cause the ignition coil to be pushed off of the spark plug, thereby resulting in ignition interruption. As shown in FIG. 13, the preferred embodiment includes ventilation 23 defined through the cylinder head cover 1 for each spark plug 901, such as a first ventilation hole 233 and a second ventilation hole 234. Each ventilation hole 233, 234 includes a ventilation hole bottom end 231 in fluid communication with the spark plug hole 22 underneath at least a portion of the ignition coil 902, as well as a ventilation hole top end 232 in fluid communication with outside air around the engine 100. The ventilation 23 allows balancing of air pressure in the spark plug hole 22 with outside air pressure, thereby preventing a pressure differential across the ignition coil 902. The ventilation 23 can also allow any water in the spark plug holes 22 to be discharged through the ventilation holes 233, 234 as water vapor, which is conducive to the stable operation of sparking mechanism 9. Together with the cooling provided by the cooling channel 211, the ventilation 23 prevents the ignition coil 902 from being pushed out and off of the spark plug 901 and avoids ignition interruption.

Figure 15:
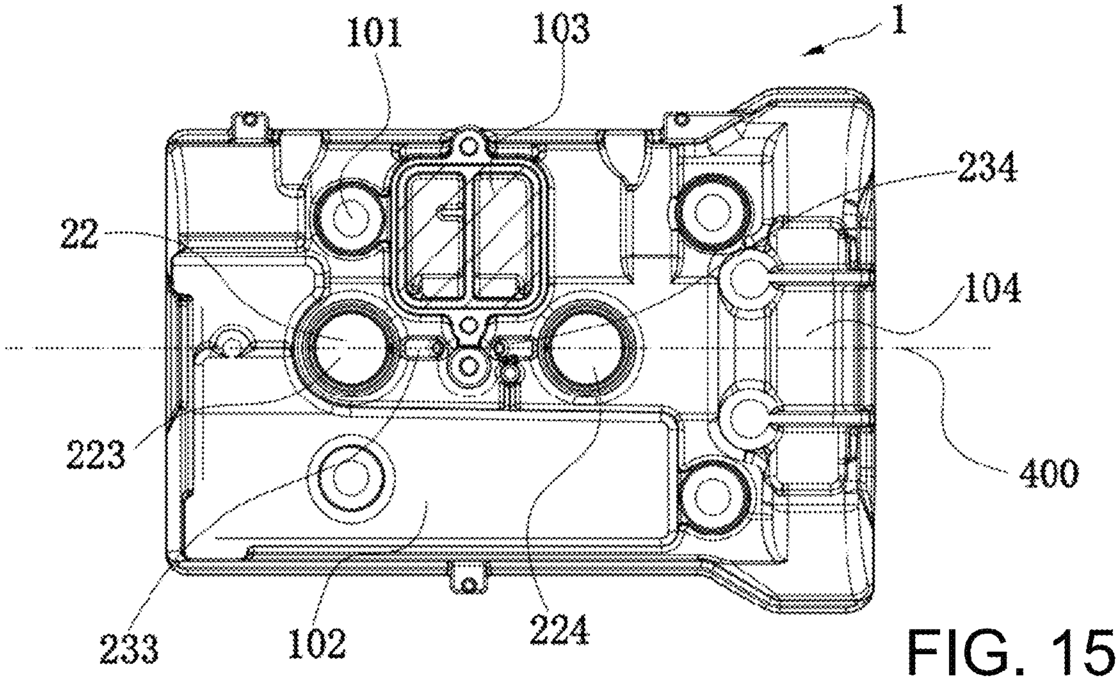
FIG. 15 is a top plan view of the cylinder head cover of FIGS. 1-3, 5, 8, 13 and 14.

FIG. 15 is a plan view that calls out several features on the cylinder head cover 1 designed for a two-cylinder engine. The cylinder head cover 1 has several bolt-mounting holes 101 for connecting the cylinder head cover 1 to the cylinder head 2. The cylinder head cover 1 defines several different zones distributed around the cover through-holes 221 of the spark plug holes 22, including an oil/air separation zone 102, one or more secondary air supply valve zones 103, and a cover timing chamber zone 104. The secondary air supply valve zones 103 are used for mounting secondary air supply valves (not shown). The cover timing chamber zone 104 houses a portion of the mechanical timing system 15. A cover midplane 400 substantially bisects the cylinder head cover 1, running through the center point of each cover through-hole 221 and bisecting the cover timing chamber zone 104. The cylinder axes 29 are preferably within the cover midplane 400. The shaft seat midlines 300 are substantially parallel to the cover midplane 400. The size, position, orientation and shape of the ventilation holes 233, 234 can be designed as desired to meet the ventilation demand, but the preferred embodiment orients both ventilation holes 233, 234 along the cover midplane 400 between the cover through-holes 221 of the spark plug holes 22, with each of the ventilation holes 233, 234 being straight and angled relative to the cylinder axes 29 for ease of machining.

As shown in FIGS. 13 and 14, each spark plug 901 includes a threaded spark plug body 9011, a hexagonal wrench surface 9012, and electrodes 9013. The spark plug 901 is used to output timed pulses of high-voltage electricity so as to generate a spark through a gap between the two electrodes 9013 of the spark plug 901, thereby igniting the air/fuel mixture in the combustion chamber 16. The hexagonal wrench surface 9012 is used for tightening or removing the threaded spark plug body 9011 into or out of its head through-hole 222 in the cylinder head 2. The length of the threaded spark plug body 9011 is preferably relatively long, such that the cooling channel 211 can extend close to the threaded spark plug body 9011 under the hexagonal wrench surface 9012. That is, the cooling channel 211 runs close to the cylinder axis 29. More heat is within the cooling range of cooling channel 211 and dissipated from the spark plug 901 via the cooling channel 211. Keeping the sparking mechanism 9 at lower temperature improves its service life. In general, the cooling channel 211 includes a space defined between the top wall of the combustion chamber 16, the wall of the intake and exhaust system 8, and the wall of the spark plug hole 22. The volume and shape of the cooling channel 211 is designed to correspond with shapes required for the intake and exhaust system 8, the combustion chamber 16, and the sparking mechanism 9. The volume of the cooling channel 211 can be increased due to the longer spark plug body 9011. The ventilation hole 23 venting the spark plug hole 22 is kept high in the cylinder head cover 1 so as to avoid interference between the ventilation hole 23 and the cooling channel 211.

Figure 16:
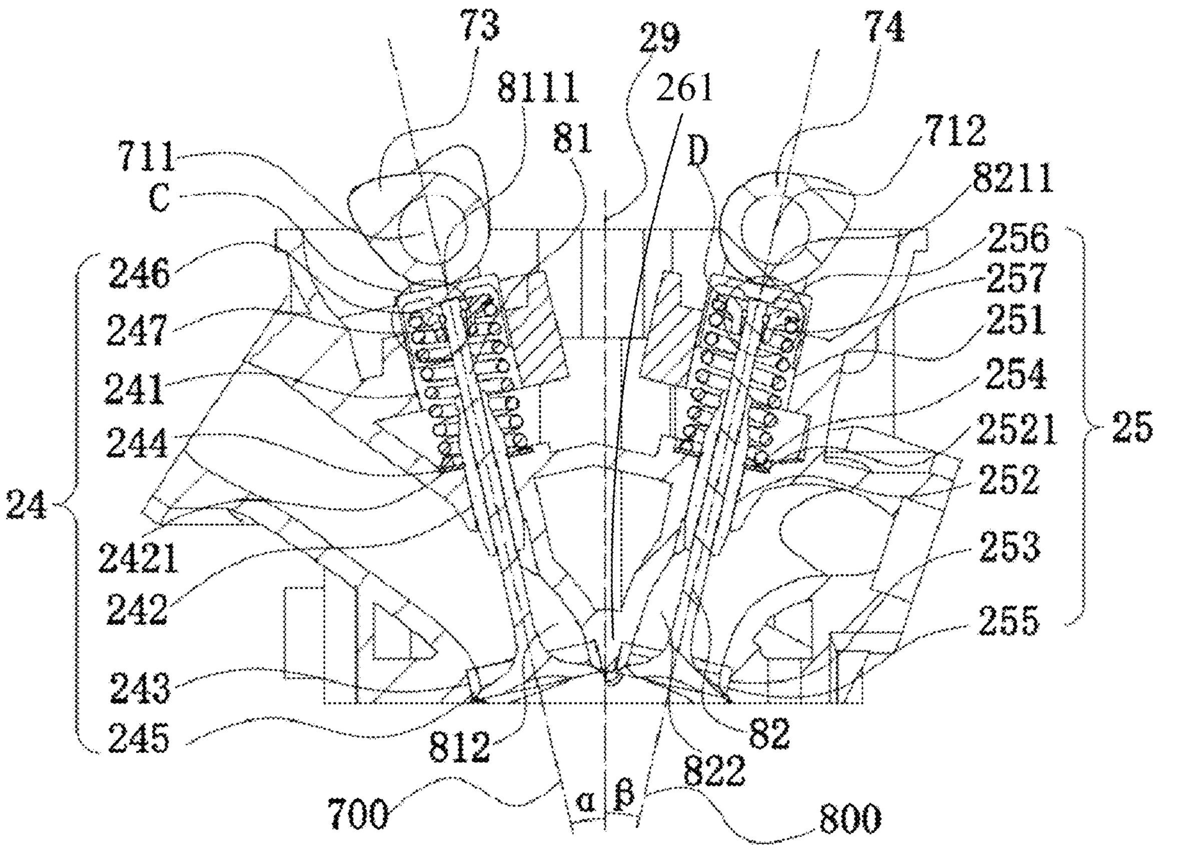
FIG. 16 is a cross-sectional view of the cylinder head, cam assembly and intake and exhaust system of FIGS. 8, 13 and 14, taken at the intake valve axis and at the exhaust valve axis.
Figure 17:
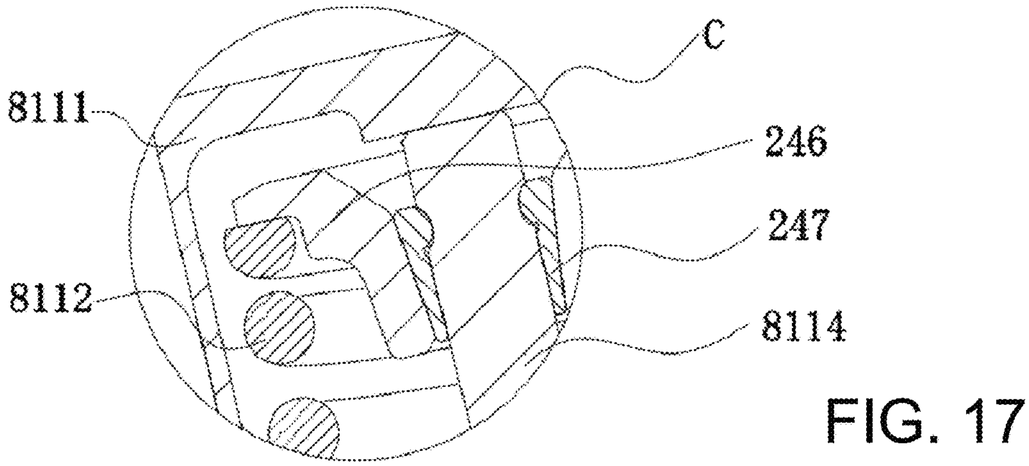
FIG. 17 is enlarged view of part C in FIG. 16.
Figure 18:
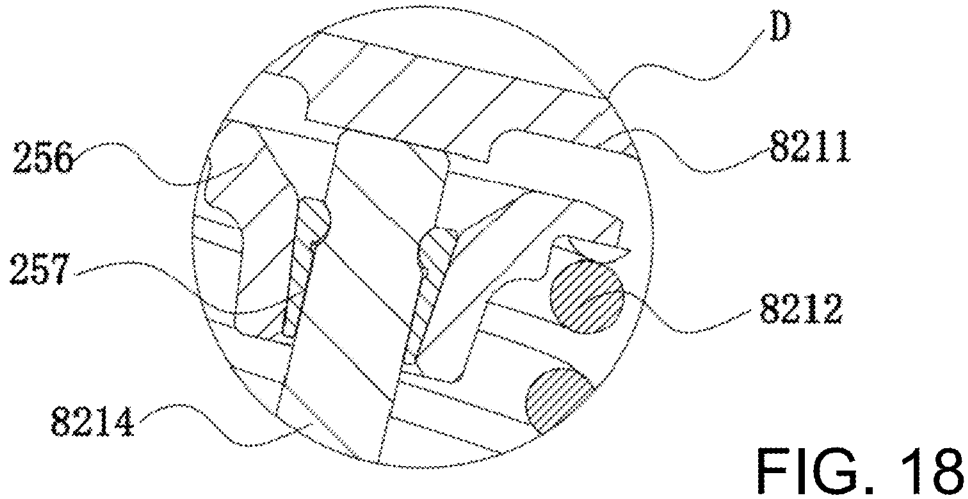
FIG. 18 is enlarged view of part D in FIG. 16.

FIG. 16 shows the intake and exhaust system 8 accommodated in the head accommodation space 2011. The intake and exhaust system 8 is used for feeding fresh air/combustible mixture into the combustion chamber 16 and for discharging the burned exhaust gas out of the combustion chamber 16. The intake and exhaust system 8 includes an intake side 81 and an exhaust side 82 for each cylinder. In the preferred embodiment, the intake side 81 for all cylinders is arranged on one side of the cylinder axis 29 inside the cylinder head 2, and the exhaust side 82 for all cylinders is arranged on the other side of the cylinder axis 29 inside the cylinder head 2.

The intake side 81 includes an intake duct 812 and at least one intake valve mechanism 811 for each cylinder, while the exhaust side 82 includes an exhaust duct 822 and at least one exhaust valve mechanism 821 for each cylinder. The intake valve mechanism(s) 811 is (are) arranged between the intake duct 812 and the cylinder axis 29, and the exhaust valve mechanism(s) 821 is (are) arranged between the exhaust duct 822 and the cylinder axis 29.

In the preferred embodiment as best shown in FIG. 20, each cylinder of the two-cylinder engine 100 preferably includes two intake valve mechanisms 811 and two exhaust valve mechanisms 821 per cylinder, i.e., four intake valve mechanisms 811 and four exhaust valve mechanisms 821 per engine 100, i.e., eight valve mechanisms 811, 821 total. As shown in FIGS. 16-19, the cylinder head 2 includes an intake valve limit structure 24 around each intake valve mechanism 811, and an exhaust valve limit structure 25 around each exhaust valve mechanism 821. Except for its placement on the intake side 81 rather than the exhaust side 82, each intake valve mechanism 811 and its valve limit structure 24 can be substantially identical to the exhaust valve mechanism 821 and its valve limit structure 25. Each (i.e., intake or exhaust, as applicable) valve limit structure 24, 25 defines a respective (i.e., intake or exhaust, as corresponding) tappet hole 241, 251, a respective valve guide hole 242, 252, a respective seat ring hole 243, 253, a respective spring seat 244, 254, a respective seat ring 245, 255, a respective lock seat 246, 256 and a respective lock clip 247, 257. Each valve mechanism 811, 821 includes a respective tappet 8111, 8211, a respective valve spring 8112, 8212, a respective valve guide 8113, 8213, and a respective valve 8114, 8214. The lower end of each tappet 8111, 8211 and a middle section of each valve spring 8112, 8212 are accommodated in the respective tappet hole 241, 251. Each lock seat 246, 256 is held to the shaft **8114*b*, 8214*b* of its associated valve 8114, 8214 by the respective lock clip 247, 257, and the lock seats 246, 256 limit radial movement of the associated valve springs 8112, 8212 to thereby fix the top ends of the valve springs 8112, 8212. The bottom end of each valve spring 8112, 8212 is positioned on the respective spring seat 244, 254 at the respective top outer edge 2421, 2521 of the respective valve guide hole 242, 252. The lower end of each valve guide 8113, 8213 is pressed into the respective valve guide hole 242, 252 through an interference fit, and the upper end of each valve guide 8113, 8213 is positioned in the interior space defined by the coil of the respective valve spring 8112, 8212. The shaft 8114*b*, 8214*b* of each valve 8114, 8214 runs through the respective valve guide 8113, 8213 and runs through the respective valve spring 8112, 8212, and is connected on its top end to the respective tappet 8111, 8211. The bottom end of each valve 8114, 8214 is a respective disc 8114*a*, 8214*a* which is disc-shaped. Each seat ring 245, 255 is fixed in its associated seat ring hole 243, 253 by an interference fit. The outer contour of each disc 8114*a*, 8214*a* is substantially consistent with the contour of the cylinder head 2 as provided by the associated seat ring 245, 255, thereby making it easy for the valve 8114, 8214 to repeatedly seal or open for timed flow into or out of the combustion chamber 16. The respective camshaft 711, 712 is positioned above each tappet 8111, 8211. The intake camshaft 711 is equipped with lobes 73 that push downwardly on the intake tappets 8111 and the exhaust camshaft 712 is equipped with lobes 74 that push downwardly on the exhaust tappets 8211. The circumferential orientation of the lobes 73, 74 on their respective camshafts 711, 712 establish the timing of the opening and closing of the associated valve 8114, 8214. Each of the tappets 8111, 8211 withstand the frictional lateral force of the lobe 73, 74 applied when the camshaft 711, 712 rotates, but transmit the downward thrust of the lobe 73, 74 to compress the associated valve spring 8112, 8212 and downwardly move the associated valve 8114, 8214. Each valve guide 8113, 8213 is used to guide the movement of the associated valve 8114, 8214 thereby ensuring that the valve 8114, 8214 moves back and forth in a straight line. Each tappet 8111, 8211 is equipped with an adjustment screw (not shown) at its top to precisely adjust the vertical position and opening gap of the associated valve 8114, 8214 under the push force of its associated lobe 73, 74 on its camshaft 711, 712**.

The crankshaft 131 controls the rotation of the camshafts 711, 712 through the mechanical timing system 15 (as shown in FIG. 2) so the lobes 73, 74 drive the opening or closing of each valve 8114, 8214 at the desired time, ensuring that the opening and closing action of the valves 8114, 8214 is synchronized with the piston movement.

Figure 19:
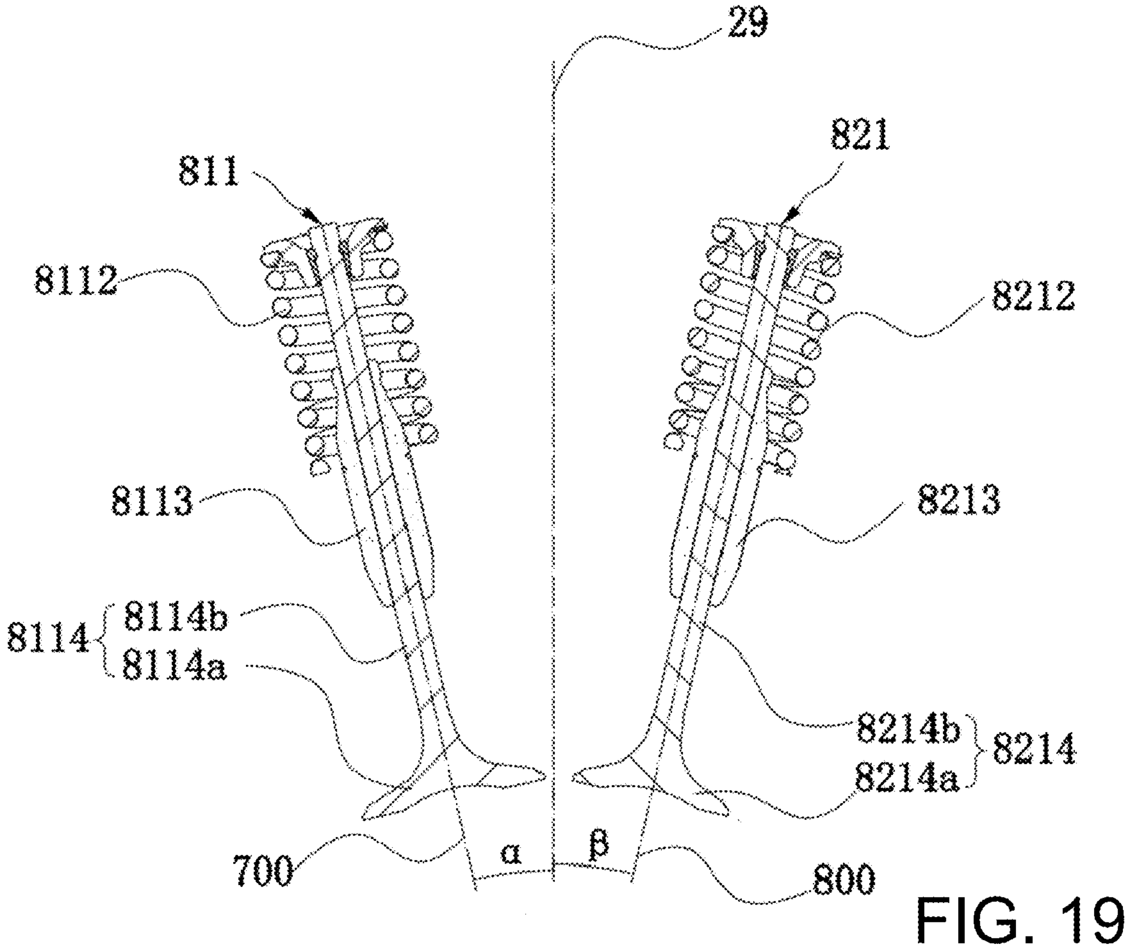
FIG. 19 is cross-sectional view, taken at the intake valve axis and at the exhaust valve axis, of portions of the intake valve mechanism and exhaust valve mechanism of FIG. 16.

Each intake valve 8114 reciprocates along an intake valve axis 700, and each exhaust valve 8214 reciprocates along an exhaust valve axis 800. For each pair of intake and exhaust valves 8114, 8214, the intake valve axis 700 is substantially on the same plane as the exhaust valve axis 800. The engine 100 defines a transverse projection plane 900 (as shown in FIG. 3) perpendicular to the rotational axis of the crankshaft 131. FIGS. 16 and 19 shown projections of the intake valve axis 700, the exhaust valve axis 800 and the cylinder axis 29 on the transverse projection plane 900. The angle defined between projections of the intake valve axis 700 and the cylinder axis 29 on the transverse projection plane 900 is defined as an intake valve angle α, and the angle defined between projections of the exhaust valve axis 800 and the cylinder axis 29 on the transverse projection plane is defined as an exhaust valve angle β. In the preferred embodiment, the intake valve angle α and the exhaust valve angle β are equal.

The best value selected for the intake valve angle α and the exhaust valve angle β depends to some extent on the diameter of the cylinders. The preferred embodiment uses a diameter of the cylinder hole 301 in the range from 70 mm to 74 mm, more preferably in the range from 71 mm to 73 mm, and most preferably a diameter of the cylinder hole 301 of 72 mm. When the diameter of the cylinder hole 301 is in the range from 70 mm to 74 mm, then the intake valve angle α and the exhaust valve angle β are preferably both in the range from 11 degrees to 15 degrees. When the diameter of the cylinder hole 301 is in the range from 71 mm to 73 mm, then the intake valve angle α and the exhaust valve angle β are preferably both in the range from 12 degrees to 14 degrees. When the diameter of cylinder hole 301 is 72 mm, then the intake valve angle α and the exhaust valve angle β are both 13 degrees. These values for the intake valve angle α and the exhaust valve angle β allow for reasonable layouts of the intake and exhaust ducts 812, 822, of the intake and exhaust valve mechanisms 811, 821, and of the intake and exhaust valve limit structures 24, 25. These values for the intake valve angle α and the exhaust valve angle β also permit reasonable intake and exhaust flow volumes and reasonable temperature field distributions, thereby making the operation of the engine 100 more stable.

The cylinder head 2 is somewhat symmetrical with respect to the cylinder axes 29. The cylinder head 2 is fixedly connected to cylinder block 3 such as at a fixing portion 307 (called out in FIG. 5) at the bottom of the cylinder head 2. As shown in FIG. 20, a collection of holes 27 are defined in the cylinder head 2, which include cylinder head bolt holes 271 such as six large cylinder head bolt holes 2711 evenly distributed around the cylinder ports 26 and two small cylinder head bolt holes 2712. The collection of holes 27 in the cylinder head 2 also includes lubricant circulation holes 272. The lubricant circulation holes 272 provide flow channels for lubricant inside the engine 100, which is conducive to the circulation of lubricant inside the engine 100, thereby improving the lubrication effect between internal components of the engine 100, and thus improving the service life of the engine 100.

A head timing chamber zone 28 is defined on one side of the cylinder head, and the timing chain 151 of the mechanical timing system 15 passes through the head timing chamber zone 28 to connect between the crankshaft 31 and the cam assembly 7. The center of the head timing chamber zone 28 preferably aligns with the centers of the two cylinder ports 26. The small cylinder head bolt holes 2712 are distributed around the head timing chamber zone 28. As shown in FIG. 20, each cylinder port 26 includes two adjacent intake valves 813, 814, and two adjacent exhaust valves 823, 824. The center distance between the two adjacent intake valves 813, 814 at the bottom of the cylinder head 2 is defined as the intake valve center distance J. The center distance between the two adjacent exhaust valves 823, 824 at the bottom of the cylinder head 2 is defined as the exhaust valve center distance K.

The values selected for the intake valve center distance J and the exhaust valve center distance K involves balancing parameters such as the diameter of the discs 8114*a*, 8214*a*, the separating wall thickness between adjacent intake valves 813, 814, the separating wall thickness between adjacent exhaust valves 823, 824, and the thickness of the nose bridge 261 between the intake side 81 and the exhaust side 82. When the diameter of cylinder hole 301 is in the range from 70 mm to 74 mm, the intake valve center distance J is preferably in the range from 30.2 mm to 34.2 mm, and the exhaust valve center distance K is preferably in the range from 27.1 mm to 31.1 mm. When the diameter of the cylinder hole 301 is in the range from 71 mm to 73 mm, the intake valve center distance J is preferably in the range from 31.2 mm to 33.2 mm, and the exhaust valve center distance K is preferably in the range from 28.1 mm to 30.1 mm. When the diameter of the cylinder hole 301 is 72 mm, the intake valve center distance J is preferably 32.2 mm, and the exhaust valve center distance K is preferably 29.1 mm. Selecting appropriate values for the intake valve center distance J and the exhaust valve center distance K can optimize the intake volume of the engine 100, thereby making the operation of the engine 100 more stable and improving its service life. Selecting appropriate values for the intake valve center distance J and the exhaust valve center distance K can also make the temperature field distribution of the engine 100 more reasonable, thereby improving heat dissipation. In addition, space utilization is improved and the structure of the engine 100 is more compact.

Figure 21:
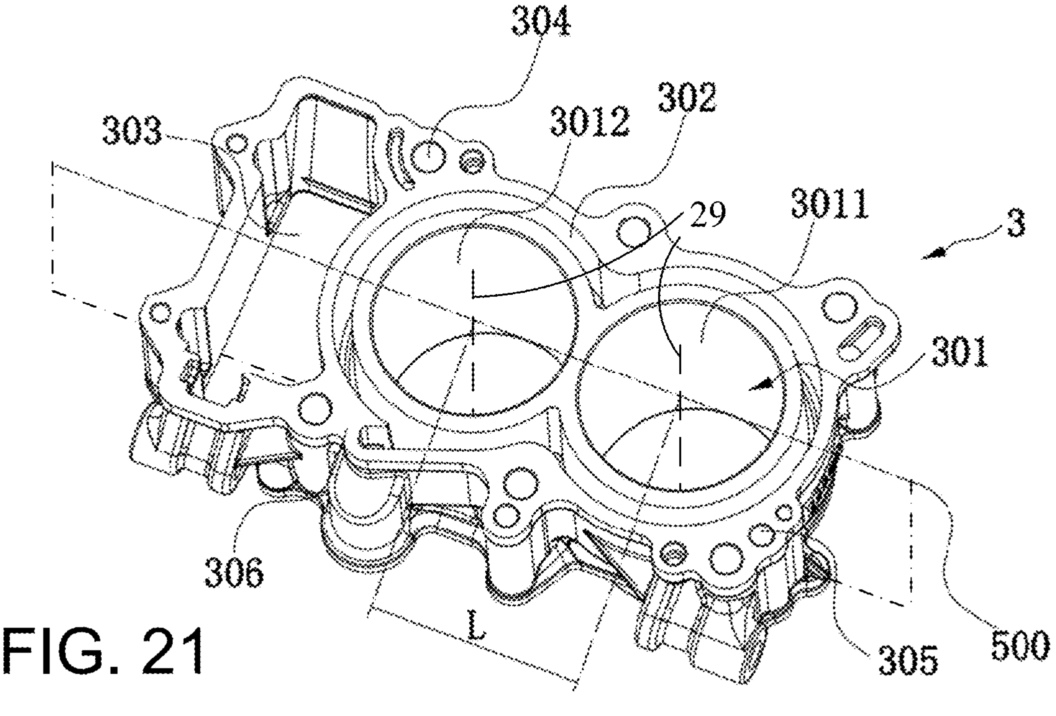
FIG. 21 is a top perspective view of the cylinder block of the engine of FIGS. 1-3 and 5.

FIG. 21 best shows the cylinder block 3 of the preferred twin cylinder engine 100. The cylinder block 3 has a cylinder block midplane 500 that contains both cylinder axes 29, and the cylinder block 3 is substantially symmetrical with respect to the cylinder block midplane 500. The transverse projection plane 900 is substantially perpendicular to the cylinder block midplane 500. The cylinder block midplane 500 is substantially parallel to the shaft seat midlines 300, and preferably is substantially coincident with the cover midplane 400. A block timing chamber zone 303 is defined on the cylinder block 3, and the timing chain 151 of the mechanical timing system 15 passes through the block timing chamber zone 303 to connect between the crankshaft 31 and the cam assembly 7. The center of the block timing chamber zone 303 is substantially located on the cylinder block midplane 500. For a twin cylinder engine 100, the cylinder holes 301 include a first cylinder hole 3011 and the second cylinder hole 3012 defined on the cylinder block 3. The first cylinder hole 3011 and the second cylinder hole 3012 are not in fluid communication with each other, and the diameter of the first cylinder hole 3011 and the diameter of the second cylinder hole 3012 are substantially the same.

Six threaded bolt holes 304 are evenly distributed around the cylinder hole 301 to correspond with the large bolt holes 27 on the cylinder head 2, used for fixing the cylinder head 2 to the cylinder block 3. At least one block lubricant circulation hole 305 is defined in the cylinder block 3 to correspond with the head lubricant circulation hole 272 to cooperatively defines a flow channel for lubricant inside the engine 100, which is conducive to the circulation of lubricant inside the engine 100, thereby improving the lubrication effect between internal components of the engine 100, and thus improving the service life of the engine 100. The cylinder block 3 has a peripheral edge 306, which is arranged around the cylinder block 3. The threaded bolt holes 304 and the block lubricant circulation hole 305 are all defined on the peripheral edge 306. If desired, the threaded bolt holes 304 may be through-holes, and also used to connect the crankcase 4 to the cylinder block 3.

In addition, a coolant jacket 302 is arranged in the cylinder block 3 evenly distributed so as to surrounds the cylinder holes 301. The inner contour of the coolant jacket 302 is substantially the same as the outer contour of the cylinder holes 301, which facilitates better cooling of the cylinder hole 301 by the coolant jacket 302, thereby improving the cooling effect on the piston mechanisms 11 and thereby enhancing the heat dissipation effect of the engine 100. When the engine 100 is a twin cylinder engine, the coolant jacket 302 forms a substantially 8-shaped contour around the first cylinder hole 3011 and the second cylinder hole 3012.

For a twin-cylinder engine 100, a cylinder center distance L is defined as the distance between the two cylinder axes 29. The value of the cylinder center distance L is equal to the diameter of the cylinder holes 3011, 3012 plus the wall thickness between the first cylinder hole 3011 and the second cylinder hole 3012. The preferred wall thickness between the first cylinder hole 3011 and the second cylinder hole 3012 is in the range of 5 to 9 mm, more preferably in the range of 6 to 8 mm, and most preferably 7 mm. These values of wall thickness mean that when the diameter of the cylinder holes 301 is in the range from 70 mm to 74 mm and most preferably 72 mm, the cylinder center distance L is in the range from 75 mm to 83 mm and most preferably 79 mm. These values for wall thickness and cylinder center distance L balance strength requirements with desired compactness and heat dissipation to improve the working efficiency and service life of the engine 100.

During the working cycle of the engine 100, the pistons 111 accelerate and decelerate quickly. Due to the repeated high-speed reciprocation, significant inertial forces are inevitably generated on the piston 111, the piston pin 112, and the connecting rod 132. A counterweight configured on the connecting rod 132 can help balance these inertial forces. But only a portion of the counterweight on the connecting rod 132 participates in linear motion, while another portion of the counterweight on the connecting rod 132 participates in rotational motion. The various inertial forces cannot be completely balanced by a counterweight on the connecting rod 132, thereby causing the engine 100 to vibrate. The vibration frequency of the engine 100 is related to the twice the rotational speed of the engine 100, with first order vibration accounting for more than 70% of the entire vibration.

Figure 22:
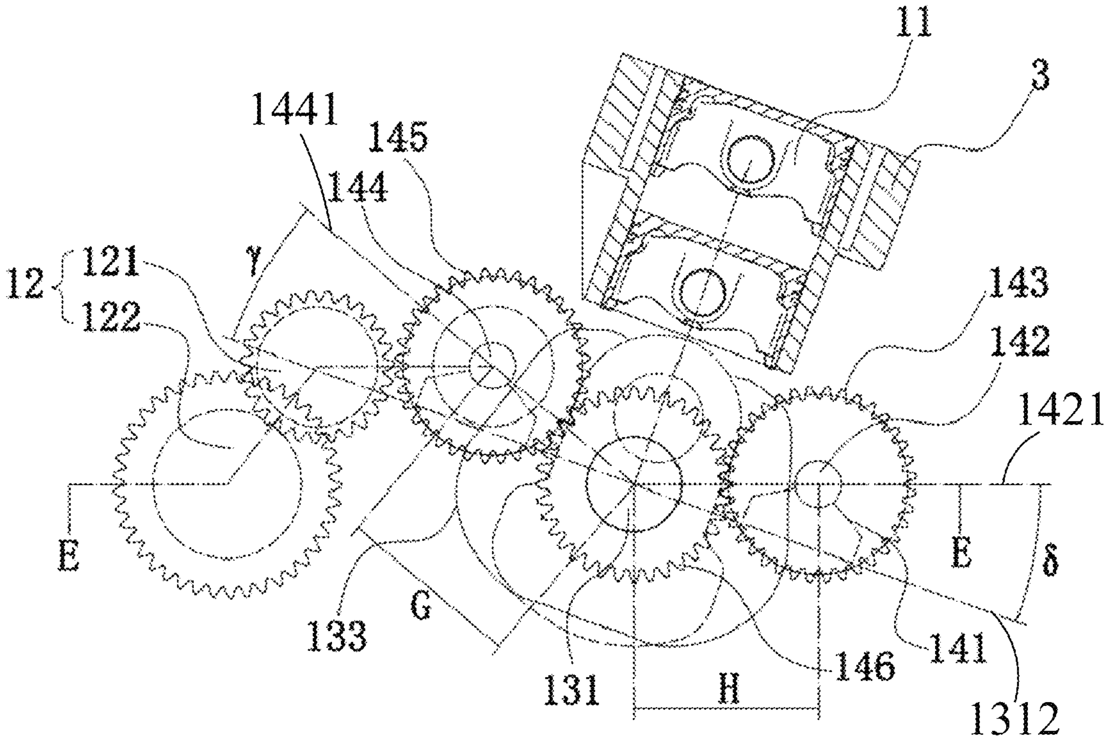
FIG. 22 is an end schematic view of the cylinder block and crankcase accommodation space of the engine of FIGS. 1-3, showing the top dead center and bottom dead center positions of the piston, and showing a slightly modified layout of the drive train.

FIG. 22 shows a counterbalance mechanism 14 used to reduce vibration. The counterbalance mechanism 14 includes two shafts 142, 144 with eccentric weights 141 that rotate synchronously with the crankshaft 131. By utilizing the reverse vibration force generated by the eccentric weights 141, the engine 100 achieves a good balance effect and vibration can be reduced.

Specifically, the counterbalance mechanism 14 includes a first counterbalance shaft 142, a first shaft gear 143, a second counterbalance shaft 144, a second shaft gear 145, and a crankshaft gear 146. The first shaft gear 143 is arranged on the first counterbalance shaft 142, the second shaft gear 145 is arranged on the second counterbalance shaft 144, and the crankshaft gear 146 is arranged on the crankshaft 131. The counterbalance shafts 142, 144 run parallel to the crankshaft 131. The crankshaft gear 146 meshes with the first shaft gear 143 and the second shaft gear 145. The rotational speed of both counterbalance shafts 142, 144 are the same as the rotational speed of the crankshaft 131. The dual counterbalance shaft method of the preferred counterbalance mechanism 14 helps balance the first-order reciprocating inertia force of the engine 100, thereby reducing the vibration of the engine 100, reducing the noise of the engine 100, extending the service life of the engine 100, and improving the comfort of the driver and passengers.

The center distance between the first counterbalance shaft 142 and the crankshaft 131 is defined as a first counterbalance center distance H, and the center distance between the second counterbalance shaft 144 and crankshaft 131 is defined as a second counterbalance center distance G. Both the first counterbalance center distance H and the second counterbalance center distance G are selected based on the envelope 133 of the connecting rod 132 and the strength of the respective counterbalance shaft 142, 144. The envelope 133 of the connecting rod 132 refers to the geometric shape defined by the motion trajectory of the connecting rod 132. The first and second counterbalance center distances H, G are preferably both in the range from 72 mm to 76 mm, most preferably 73 mm. Smaller counterbalance center distances help reduce the weight of the engine 100.

As shown in FIG. 22, a crankshaft base plane 1312 is defined which is perpendicular to the cylinder axes 29 and contains the rotational axis of the crankshaft 131. The crankshaft base plane 1312 is substantially perpendicular to the transverse projection plane 900. A first counterbalance elevation line 1421 is defined running between the rotational axis of the crankshaft 131 and the rotational axis of the first counterbalance shaft 142 in the transverse projection plane 900. A second counterbalance elevation line 1441 is defined running between the rotational axis of the crankshaft 131 and the rotational axis of the second counterbalance shaft 144 in the transverse projection plane 900. A first counterbalance elevation angle δ is defined between the first counterbalance elevation line 1421 and the crankshaft base plane 1312. A second counterbalance elevation angle γ is defined between the second counterbalance elevation line 1441 and the crankshaft base plane 1312. The first counterbalance elevation angle δ and the second counterbalance elevation angle γ are preferably both equal to each other and preferably both in the range from 0 degree to 20 degrees, more preferably both in the range from 10 degrees to 20 degrees, and most preferably 20 degrees. Designing the first counterbalance elevation angle δ and the second counterbalance elevation angle γ to be within the preferred ranges can minimize the vibration amplitude of the entire engine 100. Due to the shape of the envelope 133 of the connecting rod 132, designing the first counterbalance elevation angle δ and the second counterbalance elevation angle γ to be 20 degrees allows minimization of the intake valve center distance H and the exhaust valve center distance G, achieving a smaller overall design and lighter weight of the engine 100.

In addition, when crankshaft 131 rotates, the inertia mass of the piston 111 and the connecting rod 132 result in significant unbalanced force. In order to eliminate this unbalanced force, a balance block 1311 can be installed on the crankshaft 131. The mass size, shape, and mounting position of the balance block 1311 need to be reasonably designed to overcome the centrifugal force generated during the rotation of the crankshaft 131.

The first counterbalance shaft 142, the second counterbalance shaft 14, and the crankshaft 131 are supported in the crankcase 4, such as by each being positioned in a pair fixing shaft holes 401 defined in the crankcase 4. The drive train 12 including the drive main shaft 121 and the drive secondary shaft 122 are preferably substantially parallel to the first counterbalance shaft 142, the second counterbalance shaft 14, and the crankshaft 131, preferably also supported by pairs of fixing shaft holes 401 in the crankcase 4.

Figure 24:
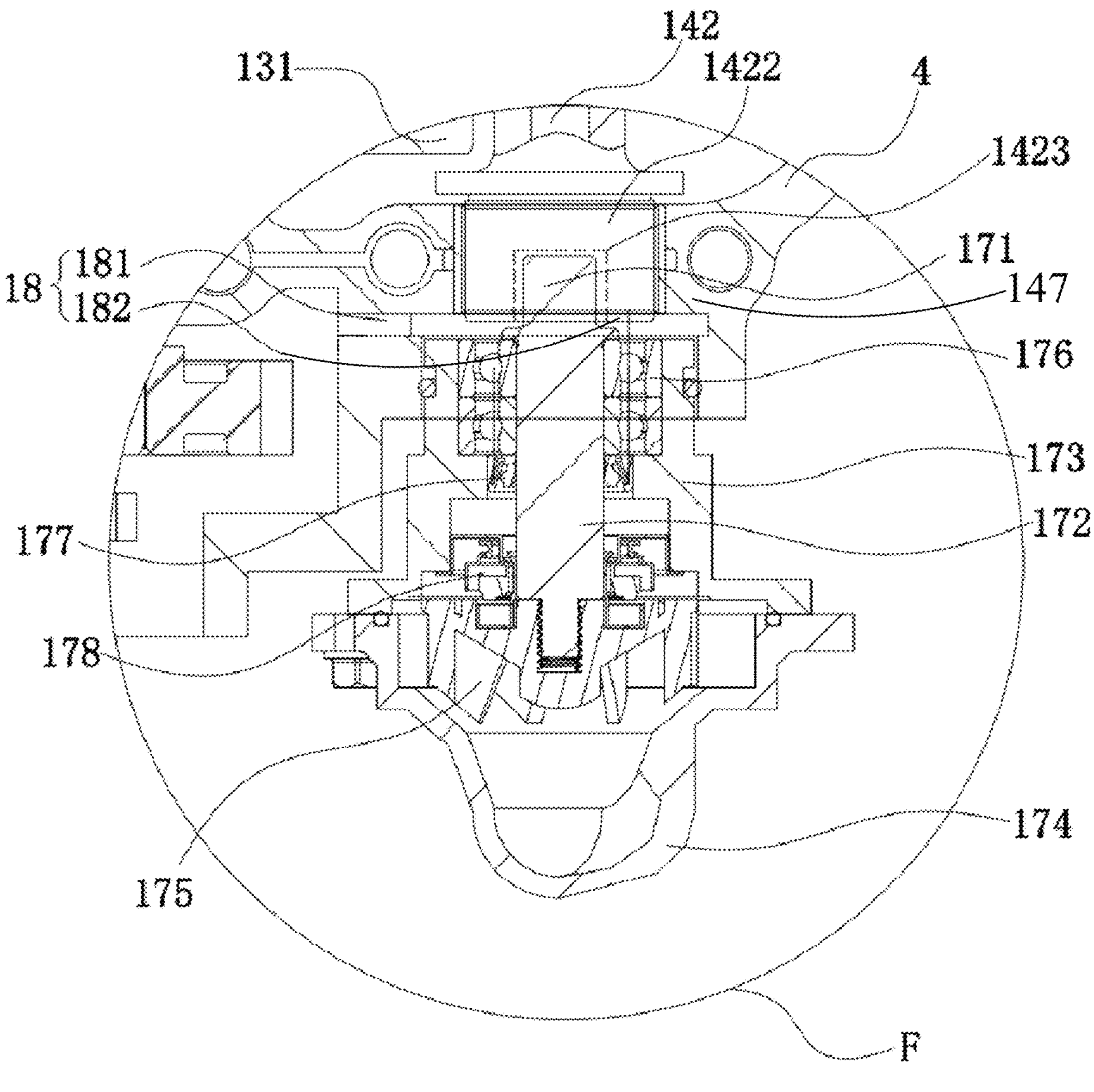
FIG. 24 is enlarged view of part F in FIG. 23.

The crankcase 4 is preferably further equipped with an oil pump assembly 17 connected to the counterbalance mechanism 14, and FIG. 24 further details the oil pump assembly 17. The first shaft gear 143 is positioned at a first end 1421 of the first counterbalance shaft 142, and the oil pump assembly 17 has a pump shaft 172 preferably connected to an opposing second end 1422 of the first counterbalance shaft 142. For instance, the crankcase 4 can include a counterbalance bearing shell 147 as one of its fixing shaft holes 401 which supports the second end 1422 of the first counterbalance shaft 142.

A connection hole 1423 having at least one flat is defined on the end face of the second end 1422 of the counterbalance shaft 142. The pump shaft 172 of the oil pump assembly 17 has a connection stem 171 with a mating flat arrangement extending out of the end face of the oil pump assembly 17. The connection stem 171 mates into the connection hole 1423 via a gap fit, so the pump shaft 172 is rotationally driven by the first counterbalance shaft 142.

The oil pump assembly 17 has a pump body 173 which can be connected to the crankcase 4 such as by bolts (not shown). The pump shaft 172 is rotationally supported within the pump body 173 by one or more pump shaft bearings 176. The pump shaft 172 has a threaded connection to a pump impeller 175 housed within a pump cover 174, and rotation of the pump shaft 172 drives rotation of the pump impeller 175. An oil seal 177 is arranged between the pump impeller 175 and the bearing 176, which is used to prevent the lubricant from leaking from the area around the pump impeller 175. A water seal 178 is arranged between the oil seal 177 and the pump impeller 175.

When lubricant in the oil pump assembly 17 reaches a certain pressure, lubricant leakage problems in the engine 100 are more likely to occur. The preferred oil pump assembly 17 has a local pressure reduction groove 18 at least partially positioned in the crankcase accommodation space 2013, such as being defined in the counterbalance bearing shell 147 of the crankcase 4 between the bearings 176 and the end face of the second end 1422 of the counterbalance shaft 142. The local pressure reduction groove 18 may be integrally formed with the crankcase 4 through casting and other methods to facilitate the processing of the local pressure reduction groove 18 and improve production efficiency.

When lubricant enters the oil pump assembly 17 under increasing pressure, the oil pump assembly 17 pushes at least some lubricant into the local pressure reduction groove 18. The local pressure reduction groove 18 includes an inner oil channel portion 182 and an outer air channel portion 181 running parallel to each other. The inner oil channel portion 182 and the outer air channel portion 181 may overlap and are in fluid communication with each other. Due to the existence of a certain thin gap in the local pressure reduction groove 18 (that is, the local pressure reduction groove 18 is a drainage channel), the lubricant will advance into the inner oil channel portion 182. At this point, when the lubricant pressure increases, air pressure will increase in the outer air channel portion 181 compressing the air therein, locally reducing lubricant pressure, thereby achieving lubricant pressure balance in the crankcase 4 and effectively solving the problem of coolant and lubricant leakage caused by excessive lubricant pressure in the crankcase 4. The inner oil channel portion 182 is thus used to balance the lubricant pressure in the crankcase 4. In an alternative embodiment, the inner and outer orientation of the oil channel portion and the air channel portion can be reversed.

It should be understood that numerous other minor modifications, embodiments and/or improvements can be devised by those skilled in the art which fall within the scope and spirit of the principles of this invention.

The invention claimed is:

1. An engine comprising:

a cylinder head defining a head accommodation space;

an intake and exhaust system at least partially located in the head accommodation space, the intake and exhaust system comprising at least one intake valve reciprocating along an intake valve axis and at least one exhaust valve reciprocating along an exhaust valve axis;

a cam assembly accommodated in the head accommodation space for controlling timing of reciprocation of the at least one intake valve and of the at least one exhaust valve;

a crankcase defining a crankcase accommodation space;

a crankshaft and connecting rod assembly at least partially accommodated in the crankcase accommodation space;

a counterbalance mechanism at least partially accommodated in the crankcase accommodation space, the counterbalance mechanism comprising a first counterbalance shaft and a second counterbalance shaft both rotationally driven by rotation of the crankshaft and connecting rod assembly;

a cylinder block defining at least one cylinder hole with a diameter in the range from 70 mm to 74 mm, with a piston reciprocating in the cylinder hole along a cylinder axis, the cylinder block and the cylinder head being connected with a combustion space in the cylinder hole between the piston and the cylinder head, the piston driving the crankshaft and connecting rod assembly to rotate about a crankshaft axis, and with a transverse projection plane defined containing the cylinder axis and perpendicular to the crankshaft axis; and a throttle valve assembly having:

a main passage in fluid communication with the intake valve, air being input into the combustion space through the main passage and based on position of the intake valve; and an idle air passage at least partially in fluid communication with the main passage;

wherein an intake valve angle defined between projections of the intake valve axis and the cylinder axis on the transverse projection plane is in the range from 11 degrees to 15 degrees, and an exhaust valve angle defined between projections of the exhaust valve axis and the cylinder axis on the transverse projection plane is in the range from 11 degrees to 15 degrees.

2. The engine of claim 1, wherein the throttle valve assembly comprises a throttle valve body which integrally defines both the main passage and the idle air passage.

3. The engine of claim 2, wherein the throttle valve assembly comprises an idle valve motor connected to the throttle valve body for controlling opening and closing of the idle air passage.

4. The engine of claim 2, wherein the idle air passage is substantially parallel to the main passage.

5. The engine of claim 1, wherein the engine has an idle state and a torque-delivery state, wherein when the engine is in the idle state, air intake of the combustion chamber flows entirely through the idle air passage; and when the engine is in the torque-delivery state, air intake of the combustion chamber flows entirely through the main passage.

6. The engine of claim 1, wherein the cylinder block defines two cylinder holes, and wherein the throttle valve body comprises two main passages each controlled by a respective throttle plate, with the idle air passage at least partially in fluid communication with both of the two main passages downstream of the respective throttle plate.

7. The engine of claim 1, further comprising a pump assembly having a pump shaft rotationally driven by the first counterbalance shaft.

8. The engine of claim 7, wherein the pump shaft is rotationally supported by one or more pump shaft bearings, wherein the first counterbalance shaft is supported by the crankcase, and wherein a local pressure reduction groove is defined between the crankcase and the one or more pump shaft bearings.

9. The engine of claim 7, wherein the pump shaft comprises a connection stem received in a connection hole on an end face of the first counterbalance shaft.

10. The engine of claim 1, wherein the cam assembly comprises:

at least one camshaft at least partially accommodated in the head accommodation space; and a shaft seat at least partially accommodated in the head accommodation space for supporting and containing the camshaft, wherein the shaft seat comprises a lubricant hole penetrating through the shaft seat and in fluid communication with the camshaft.

11. The engine of claim 10, wherein the shaft seat further comprises a sump structure comprising a sump well and at least one sump baffle partially surrounding the sump well, with the lubricant hole being at least partially defined in the sump well.

12. The engine of claim 11, wherein the sump well comprises a side longitudinal edge and a midline longitudinal edge parallel to the side longitudinal edge, wherein a height of the side longitudinal edge along the cylinder axis is different than a height of the midline longitudinal edge along the cylinder axis.

13. The engine of claim 10, wherein the shaft seat defines a shaft groove, wherein the camshaft has an annular peripheral protrusion mating into the shaft groove, thereby limiting the camshaft against longitudinal movement, and wherein the lubricant hole is in fluid communication with the shaft groove.

14. The engine of claim 1, further comprising:

a cylinder head cover connected to the cylinder head and sealing the head accommodation space, the cylinder head cover defining a spark plug hole and a ventilation hole in fluid communication with the spark plug hole, and a sparking mechanism received in the spark plug hole, the sparking mechanism comprising a spark plug and an ignition coil, with the ventilation hole connecting to the spark plug hole beneath at least a portion of the ignition coil.

15. The engine of claim 14, wherein the ventilation hole is a straight hole slanted relative to the cylinder axis.

16. The engine of claim 1, further comprising a sparking mechanism for sparking combustion within the combustion space, the sparking mechanism comprising an ignition coil and a spark plug with a hexagonal wrench surface and a threaded spark plug body, wherein the cylinder head defines a cooling channel around the threaded spark plug body beneath at least a portion of the hexagonal wrench surface.

17. The engine of claim 1, wherein a crankshaft base plane is defined perpendicular to the cylinder axis containing a rotational axis of the crankshaft, wherein a first counterbalance elevation line is defined running between the rotational axis of the crankshaft and a rotational axis of the first counterbalance shaft, wherein a second counterbalance elevation line is defined running between the rotational axis of the crankshaft and a rotational axis of the second counterbalance shaft, wherein a first counterbalance elevation angle is defined between the first counterbalance elevation line and the crankshaft base plane, wherein a second counterbalance elevation angle is defined between the second counterbalance elevation line and the crankshaft base plane, and wherein the first counterbalance elevation angle and the second counterbalance elevation angle are both in the range from 0 to 20 degrees.

18. An engine comprising:

a cylinder head defining a head accommodation space;

an intake and exhaust system at least partially located in the head accommodation space, the intake and exhaust system comprising at least one intake valve and at least one exhaust valve;

a cam assembly accommodated in the head accommodation space for controlling timing of reciprocation of the at least one intake valve and of the at least one exhaust valve; wherein the cam assembly comprises:

at least one camshaft at least partially accommodated in the head accommodation space; and a shaft seat at least partially accommodated in the head accommodation space for supporting and containing the camshaft, wherein the shaft seat comprises:

a lubricant hole penetrating through the shaft seat and in fluid communication with the camshaft; and a sump structure arranged around the lubricant hole, thereby effectively allowing splashed lubricant to be collected in the sump structure and deposited onto the camshaft through the lubricant hole;

a crankcase defining a crankcase accommodation space;

a crankshaft and connecting rod assembly at least partially accommodated in the crankcase accommodation space; and a cylinder block defining at least one cylinder hole, with a piston reciprocating in the cylinder hole along a cylinder axis, the cylinder block and the cylinder head being connected with a combustion space in the cylinder hole between the piston and the cylinder head, the piston driving the crankshaft and connecting rod assembly to rotate.

19. The engine of claim 18, wherein the shaft seat defines a shaft groove, wherein the camshaft has an annular peripheral protrusion mating into the shaft groove, thereby limiting the camshaft against longitudinal movement, and wherein the lubricant hole is in fluid communication with the shaft groove.

20. An engine comprising:

a cylinder head defining a head accommodation space;

an intake and exhaust system at least partially located in the head accommodation space, the intake and exhaust system comprising at least one intake valve and at least one exhaust valve;

a cam assembly accommodated in the head accommodation space for controlling timing of reciprocation of the at least one intake valve and of the at least one exhaust valve;

a crankcase defining a crankcase accommodation space;

a crankshaft and connecting rod assembly at least partially accommodated in the crankcase accommodation space;

a cylinder block defining at least one cylinder hole, with a piston reciprocating in the cylinder hole along a cylinder axis, the cylinder block and the cylinder head being connected with a combustion space in the cylinder hole between the piston and the cylinder head, the piston driving the crankshaft and connecting rod assembly to rotate;

a cylinder head cover connected to the cylinder head and sealing the head accommodation space, the cylinder head cover defining a spark plug hole and a ventilation hole in fluid communication with the spark plug hole, and a sparking mechanism received in the spark plug hole, the sparking mechanism comprising a spark plug and an ignition coil, with the ventilation hole connecting to the spark plug hole beneath at least a portion of the ignition coil.

* * * * *